United States Patent
Oono et al.

(10) Patent No.: US 11,427,706 B2
(45) Date of Patent: Aug. 30, 2022

(54) PLATABILITY IMPROVER, MOLDED ARTICLE FOR PLATING, PELLET COMPOSITION FOR PLATING, PLATED MOLDED OBJECT, AND PLATING METHOD

(71) Applicant: Techno-UMG Co., Ltd., Minato-ku (JP)

(72) Inventors: Noriyoshi Oono, Minato-ku (JP); Yuka Imoto, Minato-ku (JP); Hironori Kitaguchi, Minato-ku (JP); Atsushi Watanabe, Minato-ku (JP)

(73) Assignee: Techno-UMG Co., Ltd., Minato-ku (JP)

( * ) Notice: Subject to any disclaimer, the term of this patent is extended or adjusted under 35 U.S.C. 154(b) by 405 days.

(21) Appl. No.: 16/624,496

(22) PCT Filed: Jul. 6, 2018

(86) PCT No.: PCT/JP2018/025775
§ 371 (c)(1),
(2) Date: Dec. 19, 2019

(87) PCT Pub. No.: WO2019/009421
PCT Pub. Date: Jan. 10, 2019

(65) Prior Publication Data
US 2020/0172721 A1    Jun. 4, 2020

(30) Foreign Application Priority Data

| Jul. 7, 2017 | (JP) | ............................. JP2017-134124 |
| Jul. 7, 2017 | (JP) | ............................. JP2017-134125 |
| Jul. 7, 2017 | (JP) | ............................. JP2017-134126 |
| Jul. 7, 2017 | (JP) | ............................. JP2017-134127 |

(51) Int. Cl.
*C08L 53/02* (2006.01)
*C25D 5/56* (2006.01)

(52) U.S. Cl.
CPC ............ *C08L 53/02* (2013.01); *C25D 5/56* (2013.01); *C08L 2207/02* (2013.01)

(58) Field of Classification Search
CPC .................................. C08L 53/02; C25D 5/56
USPC ............................................................ 524/505
See application file for complete search history.

(56) References Cited

U.S. PATENT DOCUMENTS

| 6,245,405 B1 | 6/2001 | Kawano |
| 9,315,662 B2 | 4/2016 | Higaki |
| 2009/0226727 A1 | 9/2009 | Higaki |
| 2011/0220509 A1 | 9/2011 | Sakai et al. |

FOREIGN PATENT DOCUMENTS

| EP | 1 956 043 A1 | 8/2008 |
| EP | 3 202 850 A1 | 8/2017 |
| JP | 11-342510 A | 12/1999 |
| JP | 2002-338636 A | 11/2002 |
| JP | 2007-177223 A | 7/2007 |
| JP | 2010-126631 A | 6/2010 |
| JP | 2011-236263 | * 11/2011 |
| JP | 2011-236263 A | 11/2011 |
| WO | WO 2017/078273 A1 | 5/2017 |

OTHER PUBLICATIONS

Japanese Office Action dated Jun. 1, 2021 in Japanese Patent Application No. 2017-134127 (with unedited computer generated English translation). citing document AO therein, 10 pages.
Japanese Office Action dated Sep. 7, 2021 in Japanese Patent Application No. 2017-134124 (with English translation), 5 pages.
Japanese Office Action dated Sep. 7, 2021 in Japanese Patent Application No. 2017-134125 (with English translation), 5 pages.
Canadian Office Action dated Apr. 26, 2021 in Canadian Patent Application No. 3,066,600, 4 pages.
Combined Chinese Office Action and Search Report dated Nov. 26, 2021 in Patent Application No. 201880030298.7 (with English machine translation), dated Dec. 24, 2021, 12 pages.
Combined Taiwanese Office Action and Search Report dated Sep. 15, 2021 in Patent Application No. 107123291 (with English machine translation), dated Oct. 22, 2021, 18 pages.
Extended European Search Report dated Apr. 23, 2021 in European Patent Application No. 18828853.4, citing documents AN-AP therein, 6 pages.
Japanese Office Action dated May 11, 2021 in Japanese Patent Application No. 2017-134124 (with English translation), 6 pages.
Japanese Office Action dated May 11, 2021 in Japanese Patent Application No. 2017-134125 (with English translation), 6 pages.
International Search Report dated Sep. 25, 2018 in PCT/JP2018/025775 filed on Jul. 6, 2018, citing documents AA, AC and AO-AR therein, 1 page.

* cited by examiner

*Primary Examiner* — Deve V Hall
(74) *Attorney, Agent, or Firm* — Oblon, McClelland, Maier & Neustadt, L.L.P.

(57) ABSTRACT

The platability improver of the present invention comprises heterophasic-polymer particles having a coefficient of variation in particle diameter of 40%-90%. It is preferable that the proportion of polymer particles each having a particle diameter of 0.05 μm or larger be 80% by volume or more with respect to all the heterophasic-polymer particles and the proportion of polymer particles each having a particle diameter of 0.05 μm or larger but smaller than 0.15 μm be 10%-60% by volume with respect to all the heterophasic-polymer particles.

13 Claims, 3 Drawing Sheets

PLATABILITY IMPROVER, MOLDED ARTICLE FOR PLATING, PELLET COMPOSITION FOR PLATING, PLATED MOLDED OBJECT, AND PLATING METHOD

TECHNICAL FIELD

The present invention relates to a platability improver, a molded article for plating, a pellet composition for plating, a plated molded article, and a plating method. More specifically, the present invention relates to a platability improver that affords a molded article for plating on a surface of which a metal film or an alloy film superior in adhesiveness can be formed by plating, a molded article for plating including the same, a plated molded article having a metal film or an alloy film, and a plating method.

BACKGROUND ART

Conventionally, a plated molded article with a metal film or an alloy film obtained by plating on the surface of the molded article has been used in vehicle parts, electrical/electronic parts, OA instrument parts, home electric appliances, residential parts, clothing items, and the like for the purpose of, for example, providing a metallic appearance, improving design, enhancing durability or weatherability, or providing anti-static properties, conducting properties, or electromagnetic wave shielding properties.

As a method for plating a molded article, a so-called catalyst accelerator method in which such steps as etching (surface roughening), neutralization, catalyst application, activation, electroless plating, acid activation, and electroplating are sequentially performed, and a direct plating method in which of those steps, the electroless plating step is omitted are known.

As a thermoplastic resin composition capable of affording a molded article that is superior in molding processability, impact resistance, and the like and is suitable for forming a metal layer or an alloy layer on the surface thereof by plating, a composition mainly composed of ABS resin is known. (Patent Literatures 1, 2, and the like)

CITATIONS LIST

Patent Literature

Patent Literature 1: JP 2002-338636A
Patent Literature 2: JP 2007-177223 A

SUMMARY OF INVENTION

Technical Problems

With the expansion of the applications of plated molded articles, there is a need for a composition for plating capable of affording a molded article with further improved adhesiveness to a metal layer produced by plating. Further, when an impact is applied to a molded article, fragments are scattered if the molded article is brittlely fractured. In order to suppress this, there is a need for a composition for plating to produce a molded article that is ductilely fractured by impact.

It is an object of the present invention to provide a platability improver capable of affording a molded article (a molded article for plating) which tends to be ductilely fractured by external impact, which is superior in impact resistance, and which is capable of forming a metal layer or an alloy layer superior in adhesiveness on its surface by plating, a molded article for plating including the platability improver, a pellet composition for plating, a plated molded article with a metal layer or an alloy layer, and a plating method.

Solutions to Problems

The present invention has been devised in order to solve at least part of the problems described above, and it can be implemented as the following embodiments or application examples.

Application Example 1

One embodiment of the platability improver of the present invention includes heterophasic polymer particles whose coefficient of variation of particle diameter is in a range from 40% to 90%.

Application Example 2

Preferably, of the heterophasic polymer particles, a content ratio of polymer particles having a particle diameter of 0.05 μm or larger is 80% by volume or more based on a whole of the heterophasic polymer particles, and a content ratio of polymer particles having a particle diameter of 0.05 μm or larger and smaller than 0.15 μm is in a range from 10% to 60% by volume based on the whole of the heterophasic polymer particles.

Application Example 3

In other embodiment of the platability improver of the present invention, water is further contained.

Application Example 4

One embodiment of the molded article for plating of the present invention includes the platability improver according to any one of Application Examples 1 to 3, and a thermoplastic resin.

Application Example 5

Preferably, content ratios of the heterophasic polymer particles and the thermoplastic resin contained in the platability improver are, respectively, 10% to 80% by mass and 20% to 90% by mass based on 100% by mass of a total of the two.

Application Example 6

One embodiment of the plated molded article of the present invention includes the molded article for plating according to Application Example 4 or 5, and a plating layer disposed on a surface of the molded article for plating.

Application Example 7

One embodiment of the plating method of the present invention is a method for forming a plating layer on the molded article for plating according to Application Example 4 or 5, and the method includes etching the molded article for plating at a temperature in a range from 30° C. to 80° C., and then forming the plating layer.

Application Example 8

One embodiment of the pellet composition for plating of the present invention includes heterophasic polymer particles in the platability improver according to any one of Application Examples 1 to 3, and is a pellet composition which is used in formation of a molded article for plating, and includes pellets each including a matrix phase including a thermoplastic resin and the heterophasic polymer particles dispersed in the matrix phase, in which a content ratio of pellets that pass through a 3-mesh screen is 98% by mass or more with respect to a total amount of the pellet composition, and a content ratio of pellets that pass through a 5-mesh screen and do not pass through a 9-mesh screen is 50% by mass or more with respect to the total amount of the pellet composition.

Application Example 9

Preferably, content ratios of the heterophasic polymer particles and the thermoplastic resin contained in the pellet are, respectively, 10% to 80% by mass and 20% to 90% by mass based on 100% by mass of a total of the two.

Application Example 10

One embodiment of the method for producing a molded article for plating of the present invention is a method in which the pellet composition for plating according to Application Example 8 or 9 is melt-kneaded and then the melt-kneaded pellet composition for plating is subjected to molding into a prescribed shape.

Application Example 11

One embodiment of the molded article for plating according to the present invention is one obtained by melt-kneading the pellet composition for plating according to Application Example 8 or 9, and then molding the melt-kneaded pellet composition for plating into a prescribed shape.

Application Example 12

One embodiment of the method for producing a molded article for plating according to the present invention is a method in which the pellet composition for plating according to Application Example 8 or 9 is melt-kneaded, the resultant is subjected to molding into a prescribed shape, the resulting molded article for plating is subjected to etching, and plating is conducted.

Application Example 13

One embodiment of the molded article for plating of the present invention is one having a resin molded part, and a plating layer, in which the molded article for plating is obtained by melt-kneading the pellet composition for plating according to Application Example 8 or 9, molding the melt-kneaded pellet composition for plating into a prescribed shape, etching the resulting molded article for plating, and plating.

Advantageous Effects of Invention

The platability improver and the molded article for plating of the present invention are suitable for forming a metal layer or an alloy layer superior in adhesiveness. In addition, they are superior in impact resistance against external impact.

The molded article for plating of the present invention affords a plated molded article superior in formability of a metal layer or an alloy layer such as a copper layer by plating and in adhesiveness of these layers to a base.

The plated molded article of the present invention is superior also in appearance because it is superior in adhesiveness of a metal layer or an alloy layer to a base forming part.

According to the plating method of the present invention, it is possible to efficiently form a metal layer or an alloy layer superior in adhesiveness to a base forming part.

The pellet composition for plating of the present invention and the method for producing a molded article for plating of the present invention can afford a molded article for plating superior in impact resistance against external impact and suitable for forming a metal layer or an alloy layer superior in adhesiveness on its surface.

DESCRIPTION OF EMBODIMENTS

Hereinafter, preferred embodiments of the present invention will be described in detail. It should be appreciated that the present invention is not limited to the following embodiments, and includes various modification examples performed within the range not changing the gist of the present invention.

As used herein, "(meth)acrylic acid . . . " is a concept comprehending both of "acrylic acid . . . " and "methacrylic acid . . . ". In addition, " . . . (meth)acrylate" is a concept comprehending both of " . . . acrylate" and " . . . methacrylate". In addition, "(meth)allyl" is a concept comprehending both of "allyl" and "methallyl".

1. PLATABILITY IMPROVER

A platability improver of the present invention is characterized by including heterophasic polymer particles whose coefficient of variation of particle diameter is in a range from 40% to 90%. The platability improver of the present invention may include other components (described later) as necessary.

When a molded article for plating is produced using a composition including the platability improver containing heterophasic polymer particles according to the present invention and a thermoplastic resin, the heterophasic polymer particles are not only contained in the molded article but also exposed on a surface thereof. When electroplating or the like is applied to the molded article for plating, first, such treatment as bringing the surface of the molded article for plating into contact with an etching solution is performed. At this time, heterophasic polymer particles exposed on the surface of the molded article for plating are removed, so that concave portions are formed on the surface of the molded article. It is assumed that the concave portions formed in this manner function as anchor holes that improve adhesiveness of a plating film, and allow the preparation of a plating film that exhibits good adhesion strength.

Hereinafter, each of the components contained in the platability improver of the present invention will be described in detail.

1-1. Heterophasic Polymer Particle

The heterophasic polymer particle according to the present invention is a particle constituted not of a single homogeneous phase but of two or more phases different from each other.

Figure 1:
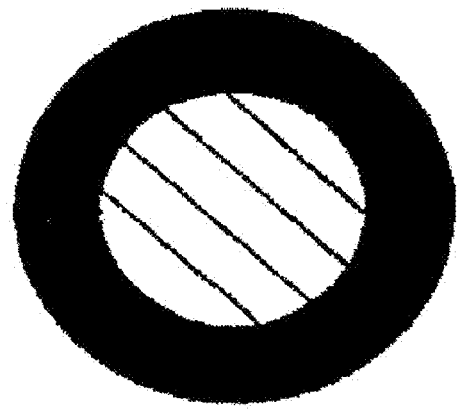
FIG. 1 is a cross-sectional view of a heterophasic polymer particle having a core-shell heterophasic structure.
Figure 2:
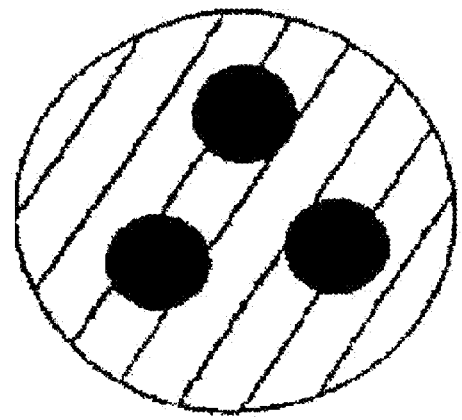
FIG. 2 is a cross-sectional view of a heterophasic polymer particle having an islands-in-the-sea heterophasic structure.
Figure 3:
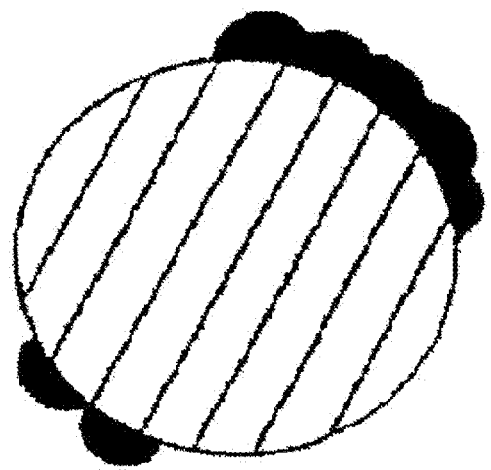
FIG. 3 is a cross-sectional view of a heterophasic polymer particle having an ocellated octopus-like heterophasic structure.
Figure 4:
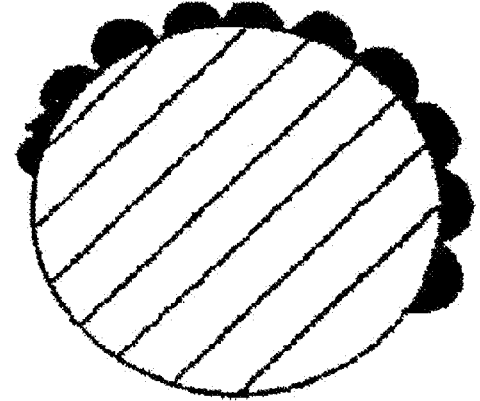
FIG. 4 is a cross-sectional view of a heterophasic polymer particle having another ocellated octopus-like heterophasic structure.
Figure 5:
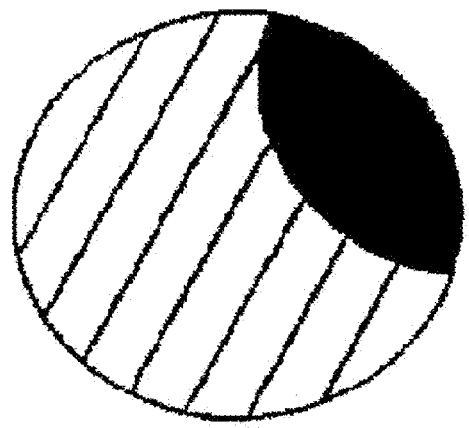
FIG. 5 is a cross-sectional view of a heterophasic polymer particle having a side-by-side heterophasic structure.
Figure 6:
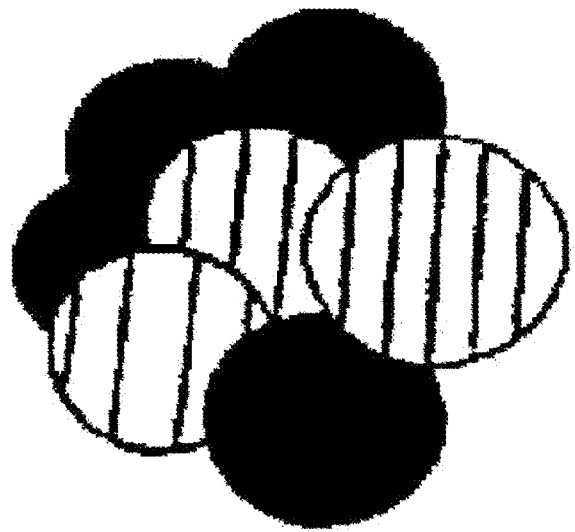
FIG. 6 is a cross-sectional view of a heterophasic polymer particle having a multiparticle heterophase-type heterophasic structure.
Figure 7:
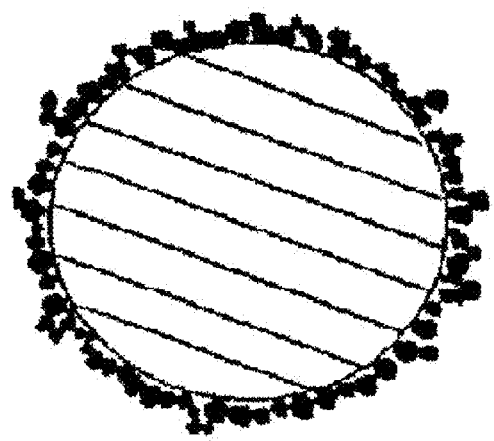
FIG. 7 is a cross-sectional view of a heterophasic polymer particle having a raspberry-like heterophasic structure.
Figure 8:
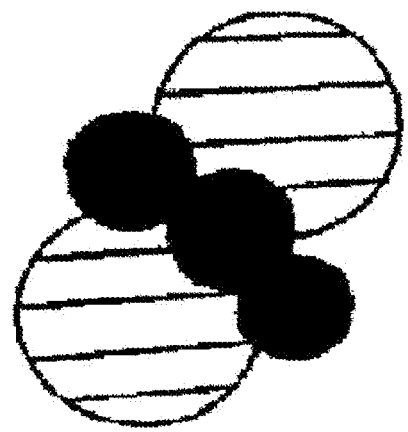
FIG. 8 is a cross-sectional view of a heterophasic polymer particle having another multiparticle heterophase-type heterophasic structure.
Figure 9:
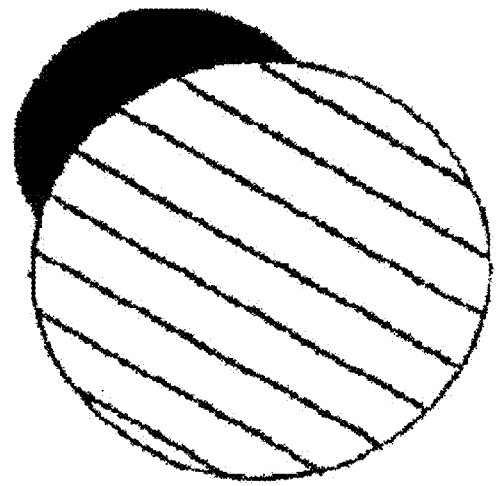
FIG. 9 is a cross-sectional view of a heterophasic polymer particle having a Daruma-shaped heterophasic structure.

Examples of a cross-sectional structure of the heterophasic polymer particle include a core-shell heterophasic structure (FIG. 1), an islands-in-the-sea heterophasic structure (FIG. 2), ocellated octopus-like heterophasic structures (FIG. 3 and FIG. 4), a side-by-side heterophasic structure (FIG. 5), a raspberry-like heterophasic structure (FIG. 7), multiparticle heterophase-type heterophasic structures (FIG. 6 and FIG. 8), a Daruma-shaped heterophasic structure (FIG. 9), and the like. Of these heterophasic structures, the core-shell heterophasic structure (FIG. 1) is preferred. The platability improver of the present invention may include heterophasic particles which are each formed of two or more of the above-described various heterophasic structures combined together.

The heterophasic polymer particles are each preferably a single particle formed by two or more polymers differing in chemical structure or a polymer having two or more block structures differing in chemical structure.

When the heterophasic polymer particle is composed of two or more polymers differing in chemical structure, the particle is preferably one formed by combining a polymer having a chemical structure superior in mechanical properties such as impact resistance with a polymer having a chemical structure high in affinity with a thermoplastic resin (styrene-based resin, acrylic resin, polycarbonate resin, polyimide resin, polyester resin, and the like) to be used in combination with the platability improver of the present invention. Further, when the heterophasic polymer particle is composed of a polymer having two or more block structures differing in chemical structure, the particle preferably has a block having a chemical structure superior in mechanical properties such as impact resistance and a block having a chemical structure high in affinity with a thermoplastic resin, which is phase-separated and forms a heterophasic structure.

In a composition obtained by kneading uniform polymer particles composed of a single polymer having a chemical structure superior in mechanical properties such as impact resistance and uniform polymer particles composed of a single polymer having a chemical structure high in affinity with a thermoplastic resin together with the thermoplastic resin, it is difficult to disperse the particles uniformly in the thermoplastic resin because of the difference in specific gravity between the two types of uniform polymer particles, the difference in particle surface tension, the difference in surface polarity, and the like. However, when each of the heterophasic polymer particles contained in the platability improver of the present invention is a single particle formed of two or more polymers differing in chemical structure or a polymer having two or more block structures differing in chemical structure, non-uniform dispersion thereof in a thermoplastic resin due to the difference of the polymers can be suppressed, and it becomes easy to uniformly mix the particles in the thermoplastic resin.

When a composition obtained by uniformly dispersing the heterophasic polymer particles in a thermoplastic resin is used to prepare a molded article for plating of the present invention, the heterophasic polymer particles are uniformly exposed on the surface of the molded article. When plating is conducted to form a metal film or an alloy film on the molded article for plating, exposed heterophasic polymer particles are removed through etching (surface roughening) treatment, such as bringing the surface of the molded article for plating into contact with an etching solution. As a result, uniform anchor holes are formed on the surface of the molded article. It is presumed that a plating film that exhibits good adhesion strength can be produced by producing a plating layer on the surface of the molded article having anchor holes thus produced.

When the heterophasic polymer particles are each composed of two or more polymers differing in chemical structure, a mass ratio (A/B) of one major polymer A having a chemical structure superior in mechanical properties such as impact resistance and other major polymer B having a chemical structure high in affinity with a thermoplastic resin, of the polymers, is preferably in a range from 1/0.1 to 1/1.5, and more preferably from 1/0.3 to 1/1. Further, a ratio of the total amount of the polymer A and the polymer B is preferably 50% by mass or more, more preferably 70% by mass or more, and further preferably 85% by mass or more with respect to the whole heterophasic polymer particles.

When the heterophasic polymer particles are each composed of a polymer having two or more block structures differing in chemical structure, as to the proportions of the block structures of the polymer, a mass ratio (A'/B') of one major block structure A' having a chemical structure superior in mechanical properties such as impact resistance and other major block structure B' having a chemical structure high in affinity with a thermoplastic resin, of the polymer, is preferably in a range from 1/0.1 to 1/1.5, and more preferably from 1/0.3 to 1/1. Further, a ratio of the total amount of the block structure A' and the block structure B' is preferably 50% by mass or more, more preferably 70% by mass or more, and further preferably 85% by mass or more with respect to the whole heterophasic polymer particles.

It is presumed that in a molded article for plating produced using the platability improver of the present invention including the above-described heterophasic polymer particles together with a thermoplastic resin, heterophasic polymer particles exposed on the surface of the molded article are removed by etching, so that anchor holes are formed, and then a plating film that exhibits good adhesion strength is afforded. However, heterophasic polymer particles that are not exposed on the surface of the molded article for plating remain within the molded article for plating without being removed by etching, and affect the mechanical strength of the molded article.

However, thanks to the inclusion with the above-described preferred configuration of heterophasic polymer particles including one major polymer A having a chemical structure superior in mechanical properties such as impact resistance and other major polymer B having a chemical structure high in affinity with a thermoplastic resin, or heterophasic polymer particles having one major block structure A' having a chemical structure superior in mechanical properties such as impact resistance and other major block structure B' having a chemical structure high in affinity with a thermoplastic resin, it is possible to prepare a plated molded article that exhibits good mechanical properties without greatly deteriorating the mechanical strength of a molded article for plating after etching.

A particle diameter of the heterophasic polymer particle contained in the platability improver of the present invention is not particularly limited, but is preferably in a range from 0.03 to 1 µm.

An average particle diameter of the heterophasic polymer particles is preferably in a range from 50 nm to 400 nm, and more preferably from 80 nm to 250 nm. In a case where the average particle diameter of the heterophasic polymer particles is in the above-mentioned range, when plating is applied to a molded article for plating including the platability improver containing the heterophasic polymer particles, minute anchor holes are formed efficiently by etching (surface roughening), so that adhesiveness of a metal film or an alloy film resulting from the plating can be further improved.

The average particle diameter of heterophasic polymer particles can be determined by staining the heterophasic polymer particles with osmium tetroxide, and then calculating an average particle diameter for 200 stained particles, for example, arbitrarily chosen from an image obtained by observing the stained polymer particles with a transmission electron microscope.

In the present invention, a coefficient of variation of particle diameter of the heterophasic polymer particles is in a range from 40% to 90%, more preferably from 40% to 80%, and further preferably from 45% to 75% since a molded article for plating superior in impact resistance is afforded and a metal layer or an alloy layer superior in adhesiveness to a base forming part is formed efficiently when plating is applied to the molded article for plating.

The coefficient of variation can be determined from the following formula using the volume average particle diameter and the standard deviation of particle diameter distribution of heterophasic polymer particles.

Coefficient of variation (%)=(standard deviation/volume average particle diameter)×100

Since the particle diameter of heterophasic polymer particles can be measured through observation with a transmission electron microscope of particles stained with osmium tetroxide and analysis of a TEM image as described above, the volume average particle diameter and the standard deviation can be calculated from a measured value of particle diameter.

In the present invention, a content ratio R1 of heterophasic polymer particles having a particle diameter of 0.05 µm or more is preferably 80% by volume or more, and more preferably 90% by volume or more with respect to the whole heterophasic polymer particles contained in the platability improver. A content ratio R2 of heterophasic polymer particles having a particle diameter of 0.05 µm or larger and smaller than 0.15 µm is preferably in a range from 10% to 60% by volume, and more preferably from 20% to 50% by volume with respect to the whole heterophasic polymer particles contained in the platability improver. Since the content ratios R1 and R2 of the heterophasic polymer particles have the above-described configuration, impact resistance of a molded article for plating produced using a platability improver and a thermoplastic resin, and adhesiveness of a metal layer or the like formed by plating can be improved.

The content ratio R1 can be calculated from the following formula, where V1 is a total volume of the heterophasic polymer particles having a particle diameter of 0.05 µm or larger, and V is a volume of the whole heterophasic polymer particles contained in the platability improver.

$$R1=(V1/V)\times100$$

Further, the content ratio R2 can be calculated from the following formula, where V2 is a total volume of the heterophasic polymer particles having a particle diameter of 0.05 µm or larger and smaller than 0.15 µm, and V is the volume of the whole heterophasic polymer particles contained in the platability improver.

$$R2=(V2/V)\times100$$

A coefficient of variation of particle diameter of heterophasic polymer particles can be controlled by the production conditions of the heterophasic polymer particles. Further, the coefficient of variation may be controlled also by preparing two or more types of heterophasic polymer particles in advance and using them together. For example, when the coefficient of variation is controlled by using two types of heterophasic polymer particles (A1) and heterophasic polymer particles (A2) differing in size from each other, the particle diameter of the heterophasic polymer particles (A1) is preferably in a range from 50 to 150 nm, and more preferably from 60 to 120 nm, and the particle diameter of the heterophasic polymer particles (A2) is preferably in a range from 200 to 800 nm, and more preferably from 250 to 700 nm.

As described above, the heterophasic polymer particle in the preferred embodiment include two or more polymers differing in chemical structure or a polymer having two or more block structures differing in chemical structure. In the present invention, the heterophasic polymer particle preferably contains two or more polymers differing in chemical structure or a polymer having two or more block structures differing in chemical structure including a repeating unit derived from a conjugated diene that contributes to mechanical properties such as impact resistance (hereinafter, referred to as "repeating unit (r1)") and a repeating unit having a functional group high in affinity with a thermoplastic resin to be used in combination with the platability improver of the present invention (hereinafter, referred to as "repeating unit (r2)").

Hereinafter, the repeating units contained in the polymers or polymer constituting such heterophasic polymer particles will be described.

When a heterophasic polymer particle having a repeating unit (r1) derived from a conjugated diene is used with a thermoplastic resin, a molded article for plating superior in mechanical properties such as impact resistance can be produced. A number of types of the repeating unit (r1) may be one, or two or more.

Examples of the conjugated diene include 1,3-butadiene, 2-methyl-1,3-butadiene, 2,3-dimethyl-1,3-butadiene, 2-chloro-1,3-butadiene, and the like. Of these, 1,3-butadiene is particularly preferred. The heterophasic polymer particle may include one repeating unit derived from a conjugated diene or may include two or more types thereof.

A content ratio of the repeating unit (r1) is preferably 60 parts by mass or more, and more preferably 70 parts by mass or more based on 100 parts by mass of the polymer containing the repeating unit (r1) derived from a conjugated diene. When the molded article for plating includes a platability improver containing heterophasic polymer particles in which the content ratio of the repeating unit (r1) derived from a conjugated diene is within the above range, impact resistance can be further improved.

The heterophasic polymer particle preferably includes a polymer that contains 45% by mass or more of the repeating unit (r1) derived from a conjugated diene and a polymer that contains 20% by mass or more in total of the repeating unit (r2) having a functional group high in affinity with a thermoplastic resin.

The heterophasic polymer particle may include a repeating unit (r2) having a functional group high in affinity with a thermoplastic resin such as a styrene-based resin, an acrylic resin, a polycarbonate resin, a polyamide resin, and a polyester resin. In this case, when a platability improver including the heterophasic polymer particles are kneaded together with a thermoplastic resin, the heterophasic polymer particles can be uniformly dispersed in the thermoplastic resin, and a molded article for plating superior in mechanical strength can be produced.

Examples of the functional group high in affinity with a thermoplastic resin include a carboxyl group, a carboxylic acid ester group, a dicarboxylic acid anhydride group, a carbonyl group, a hydroxyl group, an alkoxy group, an epoxy group, a formyl group, a cyano group, an amino group, an amide group, an imide group, an oxazoline group, an isocyanate group, a sulfoxide group, a sulfone group, a sulfonic acid group, a sulfonic acid ester group, a mercapto group, a sulfide group, a sulfinyl group, a thiocarbonyl group, a thiophosphoric acid group, a phosphonic acid group, a phosphonic acid ester group, and the like. Of these, a carboxylic acid ester group and a cyano group are preferred. The heterophasic polymer particle may include one type of the repeating unit (r2) or may include two or more types thereof.

Examples of a monomer that affords a repeating unit having a carboxylic acid ester group include an unsaturated carboxylic acid ester, and the like.

As the unsaturated carboxylic acid ester, a (meth)acrylic acid ester is preferred, and examples of the (meth)acrylic acid ester include methyl (meth)acrylate, ethyl (meth)acrylate, n-propyl (meth)acrylate, isopropyl (meth)acrylate, n-butyl (meth)acrylate, isobutyl (meth)acrylate, n-amyl (meth)acrylate, isoamyl (meth)acrylate, hexyl (meth)acrylate, cyclohexyl (meth)acrylate, 2-ethylhexyl (meth)acrylate, n-octyl (meth)acrylate, nonyl (meth)acrylate, decyl (meth)acrylate, hydroxymethyl (meth)acrylate, hydroxyethyl (meth)acrylate, ethylene glycol (meth)acrylate, ethylene glycol di(meth)acrylate, propylene glycol di(meth)acrylate, trimethylolpropane tri(meth)acrylate, pentaerythritol tetra(meth)acrylate, dipentaerythritol hexa(meth)acrylate, allyl (meth)acrylate, and the like. Among these, methyl (meth)acrylate, ethyl (meth)acrylate, 2-ethylhexyl (meth)acrylate, hydroxymethyl (meth)acrylate and hydroxyethyl (meth)acrylate are preferable, and methyl (meth)acrylate, hydroxymethyl (meth)acrylate and hydroxyethyl (meth)acrylate are particularly preferred.

Examples of a monomer that affords a repeating unit having a cyano group include an unsaturated nitrile compound, and the like.

Examples of the unsaturated nitrile compound include acrylonitrile, methacrylonitrile, ethacrylonitrile, α-chloroacrylonitrile, α-ethylacrylonitrile, α-isopropylacrylonitrile, vinylidene cyanide, and the like. Among these, acrylonitrile and methacrylonitrile are preferable, and acrylonitrile is particularly preferred.

A content ratio of the repeating unit (r2) is preferably in a range from 3% to 35% by mass, and more preferably from 5% to 30% by mass based on 100% by mass of a total of the repeating units contained in the polymer constituting the heterophasic polymer particle. When the molded article for plating includes a platability improver containing heterophasic polymer particles in which the content ratio of the repeating unit (r2) derived from an unsaturated nitrile compound is in the above range, the mechanical strength can be further improved.

The heterophasic polymer particle may include a repeating unit other than the above (hereinafter, referred to as "repeating unit (r3)"). Examples of the repeating unit (r3) include a repeating unit derived from an aromatic vinyl compound, a repeating unit derived from an unsaturated carboxylic acid, a repeating unit derived from a fluorine-containing compound having an ethylenically unsaturated bond, a repeating unit derived from an alkylamide of an ethylenically unsaturated carboxylic acid, a repeating unit derived from a vinyl carboxylate, a repeating unit derived from an acid anhydride of an ethylenically unsaturated dicarboxylic acid, and a repeating unit derived from an aminoalkylamide of an ethylenically unsaturated carboxylic acid, and the like. The heterophasic polymer particle may include one type of the repeating unit (r3) or may include two or more types thereof. Among these, the repeating unit derived from an aromatic vinyl compound and the repeating unit derived from an unsaturated carboxylic acid are preferred.

Examples of the aromatic vinyl compound include styrene, α-methylstyrene, p-methylstyrene, vinyltoluene, chlorostyrene, divinylbenzene, and the like. Among these, styrene is preferable.

Examples of the unsaturated carboxylic acid include a monocarboxylic acid or a dicarboxylic acid such as acrylic acid, methacrylic acid, crotonic acid, maleic acid, fumaric acid, and itaconic acid. Among these, acrylic acid, methacrylic acid and itaconic acid are preferable.

Examples of the fluorine-containing compound having an ethylenically unsaturated bond include vinylidene fluoride, tetrafluoroethylene, hexafluoropropylene, and the like.

Examples of the alkylamide of an ethylenically unsaturated carboxylic acid include (meth)acrylamide, N-methylolacrylamide, and the like.

Examples of the vinyl carboxylate include vinyl acetate, vinyl propionate, and the like.

Examples of the aminoalkylamide of an ethylenically unsaturated carboxylic acid include aminoethylacrylamide, dimethylaminomethylmethacrylamide, and methylaminopropylmethacrylamide, and the like.

In the heterophasic polymer particle of the above preferred embodiment, the repeating units (r1), (r2) and (r3) may be distributed in any manner, but it is preferable that at least the repeating unit (r2) be exposed on a surface of the particle.

Next, physical properties of the heterophasic polymer particle will be described.

In the heterophasic polymer particle, a temperature difference of endothermic peaks between a plurality of phases constituting the particles is preferably 5° C. or more.

In the present invention, the heterophasic polymer particle is preferably a polymer particle that exhibits two or more endothermic peaks in a temperature range from −100° C. to 200° C. when being subjected to differential scanning calorimetry (DSC) in accordance with JIS K7121. A molded article for plating including a platability improver containing a heterophasic polymer particle having two or more endothermic peaks in this temperature range has superior impact resistance and is superior in plating adhesiveness. The two or more endothermic peaks are being more preferably in a range from −95° C. to 180° C., and particularly preferably from −90° C. to 160° C.

A molded article for plating including a platability improver containing a heterophasic polymer particle that exhibits two or more endothermic peaks in the temperature range of −100° C. to 0° C. has improved elasticity and further improved impact resistance. In this case, the two or more endothermic peaks is being preferably in a range from −95° C. to −20° C., and more preferably from −90° C. to −40° C.

Further, a composition including a platability improver containing a heterophasic polymer particle that exhibits two or more endothermic peaks in the temperature range from 50° C. to 200° C. exhibits moderate fluidity at a time of melt-kneading in the production of a molded article for plating and is superior in molding processability. In this case, the two or more endothermic peaks is being preferably in a range from 70° C. to 180° C., and more preferably from 90° C. to 160° C.

A weight average molecular weight (hereinafter, also referred to as "Mw") of the heterophasic polymer particle is preferably in a range from 20,000 to 200,000, and more preferably from 50,000 to 150,000. The Mw is a standard polystyrene-equivalent value measured by gel permeation chromatography (hereinafter, also referred to as "GPC").

The method for producing the heterophasic polymer particles contained in the platability improver of the present invention is not particularly limited and the particles can be produced by a conventionally known method. For example, an emulsion polymerization method, a suspension polymerization method, a dispersion polymerization method, a method involving two-stage polymerization such as a seeded polymerization method, or a method involving mixing a plurality of polymers in the presence or absence of a solvent, and solidifying and drying the mixture, followed by pulverization, or spray-drying the mixture by such a method as a spray-drying method to form a powder can be applied. Specific examples of the method for producing the heterophasic polymer particles to be used in the present invention include: a method (two-stage polymerization method) involving using a prescribed monomer, polymerizing it by a conventional method to a polymerization conversion rate of from 20% to 100%, and subsequently adding a monomer for another polymer, followed by polymerization by a conventional method; and a method involving stirring and mixing two or more kinds of separately synthesized latex-like polymer particles at from room temperature to 300° C. for from 2 hours to 100 hours, thereby forming heterophasic polymer particles.

When producing heterophasic polymer particles of the preferred embodiment, that is, heterophasic polymer particles including repeating units (r1) derived from a conjugated diene, it is preferable to apply, for example, a method involving adding a monomer that will afford a repeating unit having a functional group high in affinity with a thermoplastic resin to an aqueous dispersion (latex) of polymer particles (raw material particles) including repeating units (r1) and having a prescribed average particle diameter produced by a known polymerization method, and performing emulsion polymerization, thereby grafting. As the monomer, an aromatic vinyl compound, a cyanidated vinyl compound, and the like are preferred. In the case of having obtained an aqueous dispersion (latex) in which heterophasic polymer particles are dispersed in an aqueous medium by the graft polymerization, it is possible to form a powder including the heterophasic polymer particles by adding a coagulant to precipitate the particles, followed by washing with water and drying. As the coagulant, an inorganic salt such as calcium chloride, magnesium sulfate, magnesium chloride, and aluminum chloride; an inorganic acid such as sulfuric acid and hydrochloric acid; an organic acid such as acetic acid, lactic acid, and citric acid; and the like can be used.

Examples of the emulsifier that is capable of using for the emulsion polymerization include an anionic surfactant such as a sulfuric acid ester salt of a higher alcohol, an alkylbenzenesulfonic acid salt, an alkyl diphenyl ether disulfonic acid salt, an aliphatic sulfonic acid salt, an aliphatic carboxylic acid salt, a dehydroabietic acid salt, a naphthalenesulfonic acid-formalin condensate, and a sulfuric acid ester salt of a nonionic surfactant; nonionic surfactants such as an alkyl ester of polyethylene glycol, an alkyl phenyl ether of polyethylene glycol, and an alkyl ether of polyethylene glycol; a fluorine-based surfactants such as a perfluorobutylsulfonic acid salt, a perfluoroalkyl group-containing phosphoric acid ester, a perfluoroalkyl group-containing carboxylic acid salt, and a perfluoroalkyl ethylene oxide adduct; and the like. The emulsifier may be used singly or in combination of two or more types thereof.

Examples of the polymerization initiator include a redox-based initiator in which an organic peroxide such as cumene hydroperoxide, diisopropylbenzene hydroperoxide, and paramentane hydroperoxide is combined with a reducing agent such as a sugar-containing pyrophosphoric acid formulations and sulfoxylate formulations; a persulfate such as potassium persulfate and sodium persulfate; a peroxide such as benzoyl peroxide, lauroyl peroxide, tert-butyl peroxylaurate, and tert-butyl peroxymonocarbonate; and the like. The polymerization initiator may be used singly or in combination of two or more types thereof.

A chain transfer agent may be used in combination during the graft polymerization. Examples of the chain transfer agent include mercaptans such as octyl mercaptan, n-dodecyl mercaptan, tert-dodecyl mercaptan, n-hexyl mercaptan, n-hexadecyl mercaptan, n-tetradecyl mercaptan, and tert-tetradecyl mercaptan; terpinolenes, α-methylstyrene dimer, tetraethylthiuram sulfide, acrolein, methacrolein, allyl alcohol, 2-ethylhexylthioglycol, and the like. The chain transfer agent may be used singly or in combination of two or more types thereof.

In a case where a monomer for graft polymerization is added to an aqueous dispersion of raw material particles including repeating units (r1) derived from a conjugated diene to conduct polymerization, a graft ratio in the resulting heterophasic polymer particle is preferably in a range from 10% to 150% by mass, and more preferably from 30% to 100% by mass.

The graft ratio is determined from the following formula.

Graft ratio (% by mass)=$\{(S-T)/T\} \times 100$ where S is the mass (g) of an insoluble matter obtained by adding 1 g of the produced heterophasic polymer particles in 20 ml of acetone, shaking it with a shaker for 2 hours, and then centrifuging it to separate an insoluble matter and a soluble matter, followed by drying, and T is the mass (g) of the raw material particles having repeating units derived from a conjugated diene contained in 1 g of the heterophasic polymer particles.

When monomers including an aromatic vinyl compound and a cyanidated vinyl compound is used in the graft polymerization, the ratio of a total amount of the aromatic vinyl compound and the cyanidated vinyl compound used is preferably 70% by mass or more, and more preferably 80% by mass or more with respect to the total amount of the monomers.

In the heterophasic polymer particle produced by conducting graft polymerization while adding a monomer that will afford repeating units having a functional group high in affinity with a thermoplastic resin to an aqueous dispersion of raw material particle including repeating units (r1) derived from a conjugated diene, an average thickness of grafted moieties formed is preferably in a range from 3 to 30 nm, and more preferably from 4 to 25 nm.

An average thickness of the grafted moieties can be measured by staining heterophasic polymer particles with osmium tetroxide or the like by a known method and observing them with a transmission election microscope.

The platability improver of the present invention can include a plurality of types of heterophasic polymer particles. When producing heterophasic polymer particles of such an embodiment, for example, when producing heterophasic polymer particles including heterophasic polymer particles (A11) and heterophasic polymer particles (A12), they can be produced by mixing an aqueous dispersion containing the heterophasic polymer particles (A11) and an aqueous dispersion containing the heterophasic polymer particles (A12), and then adding a coagulant to the mixed liquid. Further, it is also allowed to coagulate the aqueous dispersion containing the heterophasic polymer particles (A11) and the aqueous dispersion containing the heterophasic polymer particles (A12) to produce respective powders, and then mixed them.

1-2. Other Components

The platability improver of the present invention may contain other components such as water, an anti-aging agent, an antioxidant, an ultraviolet absorber, a lubricant, a plasticizer, a filler, a heat stabilizer, a flame retardant, an antistatic agent, and a coloring agent. A further preferred embodiment of the present invention is a platability improver containing water. In a case where a composition including a platability improver containing water together with a thermoplastic resin is used to produce a molded article for plating, it is superior in appearance and a plated molded article with a plating film having good adhesiveness can be obtained when further performing plating. A content ratio of water in the platability improver in this case is preferably in a range from 0.1 to 1 part by mass, and more preferably from 0.2 to 0.5 part by mass with respect to 100 parts by mass of the heterophasic polymer particles.

The amount of the water contained in the platability improver of the present invention can be determined in accordance with Method B (Karl Fischer method) of JIS K7251 "Plastics—Determination of water content".

In general, it has been considered that water evaporates at a high temperature when the above composition is subjected to molding, and impairs the appearance of the resulting molded article. For this reason, in thermoplastic resin compositions, it has been common knowledge in the industry to try to avoid mixing of water as much as possible.

However, if a molded article for plating is produced using a composition including a platability improver containing water in the above-mentioned content ratio, superior plating properties are to be exhibited. Although the expression mechanism thereof is not clear, the present inventors presume that it is caused by the following actions.

In a molded article for plating, in order to improve the adhesion strength of a plating film formed on the surface thereof, the surface is required to have appropriate irregularities. As described above, since the heterophasic polymer particles, which are essential components of the platability improver of the present invention, are not only present inside the molded article for plating but also exposed to the surface thereof, the exposed heterophasic polymer particles are removed and anchor holes are formed when the molded article for plating has come into contact with an etching solution. On the other hand, the heterophasic polymer particles that are contained within the molded article for plating and are not exposed on the surface thereof remain within the article even after etching, and affect the mechanical strength of the molded article. Therefore, by blending a large amount of heterophasic polymer particles in the composition for producing a molded article for plating, a large number of anchor holes can be formed on the surface of the molded article, so that the adhesion strength of a plating film can be improved, but the mechanical strength of the molded article itself changes greatly.

It, however, is presumed that water, which evaporates by heating during molding, moves from the inside of the molded article for plating to the surface thereof, and leaves while appropriately roughing the surface of the molded article, has a small influence on the mechanical strength of the molded article itself. As a result, it is considered that by using a platability improver including water as well as heterophasic polymer particles, anchor holes are more effectively formed on the surface of the molded article while suppressing changes in the mechanical strength of the molded article itself to a minimum, so that the adhesion strength of the plating film was successfully improved.

An amount of water in the platability improver of the present invention can be controlled, for example, by appropriately selecting a drying method alter coagulation when producing heterophasic polymer particles by emulsion polymerization. Specific example thereof is conducting heating treatment at a temperature and for a time suitable for the synthesized heterophasic polymer particles using a dryer such as a dehumidifying dryer, a vacuum dryer, or a hot air dryer.

Hereinafter, examples of components other than water will be provided.

Examples of the anti-aging agent include a naphthylamine-based compound, a diphenylamine-based compound, p-phenylenediamine-based compound, a quinoline-based compound, a hydroquinone derivative-based compound, a monophenol-based compound, a bisphenol-based compound, a trisphenol-based compound, a polyphenol-based compound, a thiobisphenol-based compound, a hindered phenol-based compound, a phosphite-based compound, an imidazole-based compound, a nickel dithiocarbamate salt-based compound, a phosphate-based compounds, and the like.

Examples of the antioxidant include a hindered amine-based compound, a hydroquinone-based compound, a hindered phenol-based compound, a sulfur-containing compounds, a phosphorus-containing compound, and the like.

Examples of the ultraviolet absorber include a benzophenone-based compound, a benzotriazole-based compound, a triazine-based compound, and the like.

Examples of the lubricant include wax, silicone, lipids, and the like.

Examples of the plasticizer include a phthalic acid ester, a trimellitic acid ester, a pyromellitic acid ester, an aliphatic monobasic acid ester, an aliphatic dibasic acid ester, a phosphoric acid ester, a polyhydric alcohol ester, an epoxy-based plasticizer, a polymer-type plasticizer, a chlorinated paraffin, and the like.

Examples of the filler include heavy calcium carbonate, colloidal calcium carbonate, light calcium carbonate, magnesium carbonate, zinc carbonate, aluminum hydroxide, magnesium hydroxide, carbon black, clay, talc, fumed silica, calcined silica, precipitated silica, pulverized silica, fused silica, kaolin, diatomaceous earth, zeolite, titanium oxide, quicklime, iron oxide, zinc oxide, barium oxide, aluminum oxide, magnesium oxide, aluminum sulfate, glass fiber, carbon fiber, glass balloon, shirasu balloon, saran balloon, phenol balloon, and the like.

Examples of the heat stabilizer include a phosphite-based heat stabilizer, a lactone-based heat stabilizer, a hindered phenol-based heat stabilizer, a sulfur-based heat stabilizer, an amine heat stabilizers, and the like.

Examples of the flame retardant include an organic flame retardant, an inorganic flame retardant, a reactive flame retardant, and the like.

Examples of the organic flame retardant include a halogen-based flame retardant such as a brominated epoxy compound, abrominated alkyltriazine compound, a brominated bisphenol epoxy resin, a brominated bisphenol phenoxy resin, a brominated bisphenol polycarbonate resin, a brominated polystyrene resin, a brominated crosslinked polystyrene resin, a brominated bisphenol cyanurate resin, a brominated polyphenylene ether, a decabromodiphenyl oxide, a tetrabromobisphenol A and an oligomer thereof a phosphorus-based flame retardant including a phosphate such as trimethyl phosphate, triethyl phosphate, tripropyl phosphate, tributyl phosphate, tripentyl phosphate, trihexyl phosphate, tricyclohexyl phosphate, triphenyl phosphate, tricresyl phosphate, trixylenyl phosphate, cresyl diphenyl phosphate, dicresyl phenyl phosphate, dimethyl ethyl phosphate, methyl dibutyl phosphate, ethyl dipropyl phosphate, and hydroxyphenyl diphenyl phosphate, a modified compound thereof, a condensed phosphate compound, a phosphazene derivative containing phosphorus element and nitrogen element; a guanidine salt, a silicone compound, a phosphazene compound, and the like.

Examples of the inorganic flame retardant include aluminum hydroxide, antimony oxide, magnesium hydroxide, zinc borate, a zirconium-based compound, a molybdenum-based compound, zinc stannate, and the like.

Examples of the reactive flame retardant include tetrabromobisphenol A, dibromophenol glycidyl ether, brominated aromatic triazines, tribromophenol, tetrabromophthalate, tetrachlorophthalic anhydride, dibromoneopentyl glycol, poly(pentabromobenzyl polyacrylate), chlorendic acid (HET acid), chlorendic anhydride (HET acid anhydride), brominated phenol glycidyl ether, dibromocresyl glycidyl ether, and the like.

2. MOLDED ARTICLE FOR PLATING

The molded article for plating of the present invention is an article including a platability improver and a thermoplastic resin. The molded article for plating of the present invention can be produced by processing a composition including a platability improver and a thermoplastic resin or these components with a conventionally known molding apparatus such as an injection molding machine, a press molding apparatus, a calendering apparatus, a T-die extrusion molding apparatus, and a profile extrusion molding apparatus.

The content ratios of the heterophasic polymer particles and the thermoplastic resin contained in the molded article for plating of the present invention are, respectively, preferably 10% to 80% by mass and 20% to 90% by mass, more preferably 15% to 70% by mass and 30% to 85% by mass, and further preferably 20% to 60% by mass and 40% to 80% by mass based on 100% by mass of a total of the two since a molded article for plating that is suitable for forming a metal layer or an alloy layer superior in adhesiveness on the surface thereof and also superior in impact resistance against external impact can be obtained efficiently.

Examples of the thermoplastic resin include a styrene-based resin such as an ABS resin, an acrylonitrile/styrene copolymer, an acrylonitrile/styrene/maleimide-based compound terpolymer, a polystyrene, a styrene/maleic anhydride copolymer; an acrylic resin such as a polymethyl methacrylate; a polycarbonate resin; a polyamide resin; a polyester resin such as a polybutylene terephthalate; an alloy including at least two of these, and the like. Of these, the styrene-based resin is preferable, and the ABS resin is particularly preferable because the heterophasic polymer particles contained in the platability improver are uniformly dispersed therein and they have further improved mechanical strength.

When the thermoplastic resin includes an ABS resin, a content ratio of the heterophasic polymer particles derived from the platability improver is preferably in a range from 30 to 180 parts by mass, and more preferably from 50 to 150 parts by mass with respect to 100 parts by mass of the thermoplastic resin.

When the thermoplastic resin includes an alloy of an ABS resin and a polycarbonate resin, a content ratio of the heterophasic polymer particles derived from the platability improver is preferably in a range from 15 to 90 parts by mass, and more preferably from 25 to 75 parts by mass with respect to 100 parts by mass of the thermoplastic resin. In the configuration of the above-mentioned alloy, a ratio of the polycarbonate resin to 100 parts by mass of the ABS resin is preferably in a range from 100 to 1000 parts by mass from viewpoints of impact resistance of a molded article for plating and adhesion strength of a plating film.

The molded article for plating of the present invention may contain other components such as an anti-aging agent, an antioxidant, an ultraviolet absorber, a lubricant, a plasticizer, a filler, a heat stabilizer, a flame retardant, an antistatic agent, and a coloring agent.

When the molded article for plating of the present invention is subjected to a conventionally known plating method such as a catalyst accelerator method, a direct plating method, and a chromium-flee plating method, a metal layer or an alloy layer superior in adhesiveness to a base and appearance can be formed achieving efficient anchor hole formability as well as superior depositibity and growability of metal or alloy.

3. PLATED MOLDED ARTICLE

The plated molded article of the present invention is an article provided with a plating layer including metal or alloy on at least a part of the surface of a molded article for plating. A thickness of the plating layer is preferably in a range from 5 to 200 μm, and more preferably from 5 to 150 μm.

In the plated molded article of the present invention, since a base molding part on which the plating layer (a metal layer or an alloy layer) is formed has concave portions formed by detachment of the heterophasic polymer particles, the plated molded article is superior in adhesiveness between the surface of the base molding part and the plating layer and also superior in appearance thereof.

The plated molded article of the present invention can be produced by a known method, that is a method of plating on a surface of the molded article for plating. The plated molded article can be produced by forming a plating layer on a molded article for plating by, for example, a catalyst accelerator method in which such steps as etching (surface roughening), neutralization, catalyst application, activation, electroless plating, acid activation, and electroplating are sequentially conducted, a direct plating method constituted by omitting the electroless plating step of the catalyst accelerator method, and the like.

The plated molded article of the present invention can be used for vehicle parts, electric products, electronic parts, housings, frames, handles, and the like.

5. PELLET COMPOSITION FOR PLATING

The pellet composition for plating of the present invention is a pellet composition including the heterophasic polymer particles in the above-described platability improver, and is a composition including a pellet including a matrix phase containing a thermoplastic resin and heterophasic polymer particle dispersed in the matrix phase (hereinafter, referred to as "heterophasic polymer particle-containing pellet"). The composition is to be used for the formation of a molded article for plating.

In the present invention, when a pellet composition for plating including heterophasic polymer particle-containing pellets with a specific size is used, a molded article for plating can be obtained that is suitable for forming a metal layer or an alloy layer superior in adhesiveness on the surface thereof and also superior in impact resistance against external impact. That is, a content ratio of heterophasic polymer particle-containing pellets that pass through a 3-mesh screen is 98% by mass or more, and more preferably 99% or more with respect to a total amount of the pellet composition. A content ratio of the heterophasic polymer particle-containing pellets that pass through a 5-mesh screen and do not pass through a 9-mesh screen is 50% by mass or more, preferably 70% by mass or more, and further preferably 85% by mass or more with respect to the total amount of the pellet composition. The "mesh" is based on the standard screen method using Tyler screens.

When the content of the heterophasic polymer particle-containing pellets that pass through a 3-mesh screen is 98% by mass or more, it is easy to conduct melt-kneading the pellet composition for plating of the present invention and a molded article for plating with a uniform composition can be easily obtained. Further, in a case where the content of the heterophasic polymer particle-containing pellets that pass through a 5-mesh screen and do not pass through a 9-mesh screen is 50% by mass or more, when the pellet composition for plating of the present invention is melt-kneaded, the generation of bubbles is suppressed and a dense molded article for plating can be produced. As a result, the mechanical strength of the molded article for plating can be further improved.

In the present invention, when a molded article for plating is produced by melt-kneading the pellet composition for plating and then molding it into a prescribed shape, the heterophasic polymer particles are not only contained in the molded article but also exposed on a surface thereof. When electroplating or the like is applied to the molded article for plating, first, such treatment as bringing the surface of the molded article for plating into contact with an etching solution is performed. At this time, heterophasic polymer particles exposed on the surface of the molded article for plating are removed, so that concave portions are formed on the surface of the molded article. It is assumed that the concave portions formed in this manner function as anchor holes that improve adhesiveness of a plating film, and allow the preparation of a plating film that exhibits good adhesion strength.

Hereinafter, the constituents of the heterophasic polymer particle-containing pellet contained in the pellet composition for plating of the present invention will be described in detail.

To the details about the heterophasic polymer particles contained in the pellet composition for plating, the above explanation of the heterophasic polymer particles in the above platability improver is applied.

The thermoplastic resin that constitutes the matrix phase of the heterophasic polymer particle-containing pellet is not particularly limited. Examples thereof include a styrene-based resin such as an ABS resin, an acrylonitrile/styrene copolymer, an acrylonitrile/styrene/maleimide-based compound terpolymer, a polystyrene, and a styrene/maleic anhydride copolymer; an acrylic resin such as a polymethyl methacrylate; a polycarbonate resin; a polyamide resin; a polyester resin such as a polybutylene terephthalate; an alloy including at least two of these; and the like. Of these, the styrene-based resin is preferable, and the ABS resin is particularly preferable since the heterophasic polymer particles contained in the molded article for plating obtained using the pellet composition for plating are uniformly dispersed therein and they have further improved mechanical strength.

The heterophasic polymer particles are each preferably a single particle formed by two or more polymers differing in chemical structure or a polymer having two or more block structures differing in chemical structure.

When the heterophasic polymer particle is composed of two or more polymers differing in chemical structure, the particle is preferably one formed by combining a polymer having a chemical structure superior in mechanical properties such as impact resistance with a polymer having a chemical structure high in affinity with a thermoplastic resin (styrene-based resin, acrylic resin, polycarbonate resin, polyimide resin, polyester resin, and the like) that constitutes the matrix phase. Further, when the heterophasic polymer particle is composed of a polymer having two or more block structures differing in chemical structure, the particle preferably has a block having a chemical structure superior in mechanical properties such as impact resistance and a block having a chemical structure high in affinity with a thermoplastic resin that constitutes the matrix phase, which is phase-separated and forms a heterophasic structure.

In a composition obtained by kneading heterophasic polymer particle-containing pellets including uniform polymer particles composed of a single polymer having a chemical structure superior in mechanical properties such as impact resistance and uniform polymer particles composed of a single polymer having a chemical structure high in affinity with the thermoplastic resin that constitutes the matrix phase, it is difficult to disperse the particles uniformly in the matrix including the thermoplastic resin because of the difference in specific gravity between the two types of uniform polymer particles, the difference in particle surface tension, the difference in surface polarity, and the like. However, when each of the heterophasic polymer particles contained in the heterophasic polymer particle-containing pellets contained in the pellet composition for plating of the present invention is a single particle formed of two or more polymers differing in chemical structure or a polymer having two or more block structures differing in chemical structure, non-uniform dispersion thereof in a thermoplastic resin due to the difference of the polymers can be suppressed, and it becomes easy to uniformly mix the particles in the matrix phase including the thermoplastic resin.

When a pellet composition for plating of the present invention is used to form the molded article for plating of the present invention, the heterophasic polymer particles are uniformly exposed on the surface of the molded article. When plating is conducted to form a metal film or an alloy film on the molded article for plating, exposed heterophasic polymer particles are removed through etching (surface roughening) treatment, such as bringing the surface of the molded article for plating into contact with an etching solution. As a result, uniform anchor holes are formed on the surface of the molded article. It is presumed that a plating film that exhibits good adhesion strength can be produced by producing a plating layer on the surface of the molded article having anchor holes thus produced.

When the heterophasic polymer particles are each composed of two or more polymers differing in chemical structure, a mass ratio (A/B) of one major polymer A having a chemical structure superior in mechanical properties such as impact resistance and other major polymer B having a chemical structure high in affinity with a thermoplastic resin that constitutes the matrix phase, of the polymers, is preferably in a range from 1/0.1 to 1/1.5, and more preferably from 1/0.3 to 1/1. Further, a ratio of the total amount of the polymer A and the polymer B is preferably 50% by mass or more, more preferably 70% by mass or more, and further preferably 85% by mass or more with respect to the whole heterophasic polymer particles.

When the heterophasic polymer particles are each composed of a polymer having two or more block structures differing in chemical structure, as to the proportions of the block structures of the polymer, a mass ratio (A'/B') of one major block structure A having a chemical structure superior in mechanical properties such as impact resistance and other major block structure B' having a chemical structure high in affinity with a thermoplastic resin that constitutes the matrix phase, of the polymer, is preferably in a range from 1/0.1 to 1/1.5, and more preferably from 1/0.3 to 1/1. Further, a ratio of the total amount of the block structure A and the block structure B' is preferably 50% by mass or more, more preferably 70% by mass or more, and further preferably 85% by mass or more with respect to the whole heterophasic polymer particles.

It is presumed that in a molded article for plating produced using the pellet composition for plating of the present invention, heterophasic polymer particles exposed on the surface of the molded article are removed by etching, so that anchor holes are formed, and then a plating film that exhibits good adhesion strength is afforded. However, heterophasic polymer particles that are not exposed on the surface of the molded article for plating remain within the molded article for plating without being removed by etching, and affect the mechanical strength of the molded article.

However, thanks to the inclusion with the above-described preferred configuration of heterophasic polymer particles including one major polymer A having a chemical structure superior in mechanical properties such as impact resistance and other major polymer B having a chemical structure high in affinity with a thermoplastic resin that constitutes the matrix phase, or heterophasic polymer particles having one major block structure A' having a chemical structure superior in mechanical properties such as impact resistance and other major block structure B' having a chemical structure high in affinity with a thermoplastic resin that constitutes the matrix phase, it is possible to prepare a plated molded article that exhibits good mechanical properties without greatly deteriorating the mechanical strength of a molded article for plating after etching.

A particle diameter of the heterophasic polymer particles contained in the heterophasic polymer particle-containing pellet according to the present invention is not particularly limited, but is preferably in a range from 0.03 to 1 μm.

An average particle diameter of the heterophasic polymer particles is preferably in a range from 50 nm to 400 nm, and more preferably Item 80 nm to 250 nm. When a molded article for plating produced using a pellet composition for plating of the present invention including heterophasic polymer particle-containing pellets containing heterophasic polymer particles within the above-described range is subjected to plating, minute anchor holes are formed efficiently by etching (surface roughening), so that adhesiveness of a metal film or an alloy film resulting from the plating can be further improved.

The average particle diameter of heterophasic polymer particles can be determined by staining the heterophasic polymer particles with osmium tetroxide, and then calculating an average particle diameter for 200 stained particles, for example, arbitrarily chosen from an image obtained by observing the stained polymer particles with a transmission electron microscope.

In the heterophasic polymer particle-containing pellet according to the present invention, a content ratio R1 of heterophasic polymer particles having a particle diameter of 0.05 μm or more is preferably 80% by volume or more, and more preferably 90% by volume or more with respect to the whole heterophasic polymer particles contained in the heterophasic polymer particle-containing pellet A content ratio R2 of heterophasic polymer particles having a particle diameter of 0.05 μm or larger and smaller than 0.15 μm is preferably in a range from 10% to 60% by volume, and more preferably from 20% to 50% by volume with respect to the whole heterophasic polymer particles contained in the heterophasic polymer particle-containing pellet. Since the content ratios R1 and R2 of the heterophasic polymer particles have the above-described configuration, impact resistance of a molded article for plating produced using the pellet composition for plating, and adhesiveness of a metal layer or the like formed by plating can be improved.

The content ratio R1 can be calculated from the following formula, where V1 is a total volume of the heterophasic polymer particles having a particle diameter of 0.05 μm or larger, and V is a volume of the whole heterophasic polymer particles contained in the heterophasic polymer particle-containing pellet.

$$R1 = (V1/V) \times 100$$

Further, the content ratio R2 can be calculated from the following formula, where V2 is a total volume of the heterophasic polymer particles having a particle diameter of 0.05 μm or larger and smaller than 0.15 μm, and V is the volume of the whole heterophasic polymer particles contained in the heterophasic polymer particle-containing pellet.

$$R2=(V2/V)\times 100$$

A coefficient of variation of particle diameter of heterophasic polymer particles can be controlled by the production conditions of the heterophasic polymer particles. Further, the coefficient of variation may be controlled also by preparing two or more types of heterophasic polymer particles in advance and using them together. For example, when the coefficient of variation is controlled by using two types of heterophasic polymer particles (A1) and heterophasic polymer particles (A2) differing in size from each other, the particle diameter of the heterophasic polymer particles (A1) is preferably in a range from 50 to 150 nm, and more preferably from 60 to 120 nm, and the particle diameter of the heterophasic polymer particles (A2) is preferably in a range from 200 to 800 nm, and more preferably from 250 to 700 nm.

As described above, the heterophasic polymer particle in the preferred embodiment include two or more polymers differing in chemical structure or a polymer having two or more block structures differing in chemical structure. In the present invention, the heterophasic polymer particle preferably contains two or more polymers differing in chemical structure or a polymer having two or more block structures differing in chemical structure including a repeating unit derived from a conjugated diene that contributes to mechanical properties such as impact resistance (hereinafter, referred to as "repeating unit (r1)") and a repeating unit having a functional group high in affinity with the thermoplastic resin that constitutes the matrix phase (hereinafter, referred to as "repeating unit (r2)").

The above explanation is applied to the repeating units contained in the polymer constituting such a heterophasic polymer particle.

When a pellet composition for plating including heterophasic polymer particle-containing pellets containing heterophasic polymer particles is used, a molded article for plating superior in mechanical properties such as impact resistance can be produced. A number of types of the repeating unit (r1) may be one, or two or more.

A content ratio of the repeating unit (r1) is preferably 60 parts by mass or more, and more preferably 70 parts by mass or more based on 100 parts by mass of the polymer containing the repeating unit (r1) derived from a conjugated diene. When a pellet composition for plating including heterophasic polymer particle-containing pellets containing heterophasic polymer particles in which the content ratio of the repeating unit (r1) derived from a conjugated diene is within the above-mentioned range, impact resistance can be further improved in a resulting molded article for plating.

The heterophasic polymer particle preferably includes a polymer that contains 45% by mass or more of the repeating unit (r1) derived from a conjugated diene and a polymer that contains 20% by mass or more in total of the repeating unit (r2) having a functional group high in affinity with a thermoplastic resin constituting the above matrix phase.

In a case where the heterophasic polymer particle includes a repeating unit (r2) having a functional group high in affinity with the thermoplastic resin that constitutes the matrix phase, when a pellet composition for plating including pellets containing the heterophasic polymer particles are kneaded, the heterophasic polymer particles can be uniformly dispersed in the thermoplastic resin, and a molded article for plating superior in mechanical strength can be produced.

A content ratio of the repeating unit (r2) is preferably in a range from 3% to 35% by mass, and more preferably from 5% to 30% by mass based on 100% by mass of a total of the repeating units contained in the polymer constituting the heterophasic polymer particle. When a pellet composition for plating including heterophasic polymer particle-containing pellets containing heterophasic polymer particles in which the content ratio of the repeating unit (r2) derived from an unsaturated nitrile compound is in the above range is used in particular, the mechanical strength can be further improved in a resulting molded article for plating.

The heterophasic polymer particle may include a repeating unit other than the above (hereinafter, referred to as "repeating unit (r3)"). Examples of the repeating unit (r3) include a repeating unit derived from an aromatic vinyl compound, a repeating unit derived from an unsaturated carboxylic acid, a repeating unit derived rum a fluorine-containing compound having an ethylenically unsaturated bond, a repeating unit derived from an alkylamide of an ethylenically unsaturated carboxylic acid, a repeating unit derived from a vinyl carboxylate, a repeating unit derived from an acid anhydride of an ethylenically unsaturated dicarboxylic acid, and a repeating unit derived from an aminoalkylamide of an ethylenically unsaturated carboxylic acid, and the like. The heterophasic polymer particle may include one type of the repeating unit (r3) or may include two or more types thereof. Among these, the repeating unit derived from an aromatic vinyl compound and the repeating unit derived from an unsaturated carboxylic acid are preferred.

In the heterophasic polymer particle of the above preferred embodiment, the repeating units (r1), (r2) and (r3) may be distributed in any manner, but it is preferable that at least the repeating unit (r2) be exposed on a surface of the particle.

Next, physical properties of the heterophasic polymer particle will be described.

In the heterophasic polymer particle, a temperature difference of endothermic peaks between a plurality of phases constituting the particles is preferably 5° C. or more.

In the present invention, the heterophasic polymer particle is preferably a polymer particle that exhibits two or more endothermic peaks in a temperature range from −100° C. to 200° C. when being subjected to differential scanning calorimetry (DSC) in accordance with JIS K7121. A molded article for plating obtained using a pellet composition for plating including a heterophasic polymer particle-containing pellet containing the heterophasic polymer particle having two or more endothermic peaks in this temperature range has superior impact resistance and is superior in plating adhesiveness. The two or more endothermic peaks are being more preferably in a range from −95° C. to 180° C., and particularly preferably from −90° C. to 160° C.

A molded article for plating obtained using a pellet composition for plating including a heterophasic polymer particle-containing pellet containing the heterophasic polymer particle having two or more endothermic peaks in the temperature range of −100° C. to 0° C. has improved elasticity and further improved impact resistance. In this case, the two or more endothermic peaks is being preferably in a range from −95° C. to −20° C., and more preferably from −90° C. to −40° C.

Further, a heterophasic polymer particle-containing pellet containing a heterophasic polymer particle having two or more endothermic peaks in the temperature range from 50° C. to 200° C. exhibits moderate fluidity at a time of melt-kneading in the production of a molded article for plating and is superior in molding processability. In this case, the two or more endothermic peaks is being preferably in a range from 70° C. to 180° C., and more preferably from 90° C. to 160° C.

When producing heterophasic polymer particles of the preferred embodiment, that is, heterophasic polymer particles including repeating units (r1) derived from a conjugated diene, it is preferable to apply, for example, a method involving adding a monomer that will afford a repeating unit having a functional group high in affinity with a thermoplastic resin that constitutes the matrix phase to an aqueous dispersion (latex) of polymer particles (raw material particles) including repeating units (r1) and having a prescribed average particle diameter produced by a known polymerization method, and performing emulsion polymerization, thereby grafting. As the monomer, an aromatic vinyl compound, a cyanidated vinyl compound, and the like are preferred. In the case of having obtained an aqueous dispersion (latex) in which heterophasic polymer particles are dispersed in an aqueous medium by the graft polymerization, it is possible to form a powder including the heterophasic polymer particles by adding a coagulant to precipitate the particles, followed by washing with water and drying. As the coagulant, an inorganic salt such as calcium chloride, magnesium sulfate, magnesium chloride, and aluminum chloride; an inorganic acid such as sulfuric acid and hydrochloric acid; an organic acid such as acetic acid, lactic acid, and citric acid; and the like can be used.

In the heterophasic polymer particle produced by conducting graft polymerization while adding a monomer that will afford repeating units having a functional group high in affinity with a thermoplastic resin that constitutes the matrix phase to an aqueous dispersion of raw material particle including repeating units (r1) derived from a conjugated diene, an average thickness of grafted moieties formed is preferably in a range from 3 to 30 nm, and more preferably from 4 to 25 nm.

An average thickness of the grafted moieties can be measured by staining heterophasic polymer particles with osmium tetroxide or the like by a known method and observing them with a transmission electron microscope.

The heterophasic polymer particle-containing pellets can include a plurality of types of heterophasic polymer particles. When producing heterophasic polymer particles of such an embodiment, for example, when producing heterophasic polymer particles including heterophasic polymer particles (A11) and heterophasic polymer particles (A12), they can be produced by mixing an aqueous dispersion containing the heterophasic polymer particles (A11) and an aqueous dispersion containing the heterophasic polymer particles (A12), and then adding a coagulant to the mixed liquid. Further, it is also allowed to coagulate the aqueous dispersion containing the heterophasic polymer particles (A11) and the aqueous dispersion containing the heterophasic polymer particles (A12) to produce respective powders, and then mixed them.

The content ratios of the heterophasic polymer particles contained in the heterophasic polymer particle-containing pellets and the thermoplastic resin are, respectively, preferably 10% to 80% by mass and 20% to 90% by mass, more preferably 15% to 70% by mass and 30% to 85% by mass, and further preferably 20% to 60% by mass and 40% to 80% by mass based on 100% by mass of a total of the two since a molded article for plating that is suitable for forming a metal layer or an alloy layer superior in adhesiveness on the surface thereof and also superior in impact resistance against external impact can be obtained efficiently.

When the thermoplastic resin includes an ABS resin, a content ratio of the heterophasic polymer particles derived from the pellet composition for plating of the present invention is preferably in a range from 30 to 180 parts by mass, and more preferably from 50 to 150 parts by mass with respect to 100 parts by mass of the thermoplastic resin.

When the thermoplastic resin includes an alloy of an ABS resin and a polycarbonate resin, a content ratio of the heterophasic polymer particles derived from the pellet composition for plating of the present invention is preferably in a range from 15 to 90 parts by mass, and more preferably from 25 to 75 parts by mass with respect to 100 parts by mass of the thermoplastic resin. In the configuration of the above-mentioned alloy, a ratio of the polycarbonate resin to 100 parts by mass of the ABS resin is preferably in a range from 100 to 1000 parts by mass from viewpoints of impact resistance of a molded article for plating and adhesion strength of a plating film.

The heterophasic polymer particle-containing pellet contained in the pellet composition for plating of the present invention may be composed of a thermoplastic resin and heterophasic polymer particles, or may further include other components. Examples of the other components include an anti-aging agent, an antioxidant, an ultraviolet absorber, a lubricant, a plasticizer, a filler, a heat stabilizer, a flame retardant, an antistatic agent, a coloring agent, and the like. To the details about the other components, the above explanation is applied.

The heterophasic polymer particle-containing pellet can be produced by processing a thermoplastic resin composition including a thermoplastic resin, heterophasic polymer particles, and the other optionally blended components with an extruder or the like. For example, the thread diameter and the cut length thereof can be appropriately changed by adjusting a die diameter, a take-up speed, and the like using a pelletizer. Accordingly, the pellet composition for plating of the present invention can be produced by classifying a mixture of heterophasic polymer particle-containing pellets having various sizes with prescribed screens, and mixing the resulting heterophasic polymer particle-containing pellets with prescribed sizes so as to achieve the configuration of the pellet composition for plating of the present invention.

The pellet composition for plating of the present invention may consist only of the heterophasic polymer particle-containing pellet, or alternatively may include the heterophasic polymer particle-containing pellet and other pellets.

The other pellets are not particularly limited, and may be, for example, pellets made only of a thermoplastic resin or pellets including a thermoplastic resin and the above described other components. In a case where the pellet composition for plating of the present invention includes other pellets containing a thermoplastic resin, a total amount of the thermoplastic resin and a content ratio of the heterophasic polymer particles may be the above-described preferred ratios with the pellet composition for plating of the present invention.

6. MOLDED ARTICLE FOR PLATING AND PRODUCTION METHOD THEREOF

The molded article for plating obtained from the pellet composition for plating of the present invention is an article produced by conducting melt-kneading the pellet composition for plating of the present invention and subsequently molding it into a prescribed shape, and has a structure in which heterophasic polymer particles are dispersed in a thermoplastic resin as a matrix like the heterophasic polymer particle-containing pellet. Some heterophasic polymer particles are exposed.

In a case of melt-kneading the pellet composition for plating, the melt-kneading is performed using a kneader, an extruder, or the like at a temperature equal to or higher than the melting point of the thermoplastic resin having the highest melting point among the thermoplastic resins contained in the pellet. After that, a molded article for plating is obtained by processing with a conventionally known molding apparatus such as an injection molding machine, a press molding apparatus, a calendering apparatus, a T-die extrusion molding apparatus, and a profile extrusion molding apparatus.

When the molded article for plating of the present invention is subjected to a conventionally known plating method such as a catalyst accelerator method, a direct plating method, and a chromium-free plating method, a metal layer or an alloy layer superior in adhesiveness to a base and appearance can be formed achieving efficient anchor hole formability as well as superior depositibity and growability of metal or alloy.

7. PLATED MOLDED ARTICLE AND PRODUCTION METHOD THEREOF

The plated molded article obtained using the pellet composition for plating of the present invention is an article including a resin molded part and a plating layer (a plating film), obtained by conducting melt-kneading the pellet composition for plating of the present invention, then molding it into a prescribed shape, etching the resulting molded article for plating, and subsequently performing plating. When a plated molded article is produced, for example, a catalyst accelerator method in which such steps as etching (surface roughening), neutralization, catalyst application, activation, electroless plating, acid activation, and electroplating are sequentially performed, a direct plating method constituted by omitting the electroless plating step of the catalyst accelerator method, and the like can be applied to a molded article for plating. Etching and plating may be applied to the whole or part of the surface of the molded article for plating.

A thickness of the plating layer is not particularly limited, but is preferably in a range from 5 to 200 μm, and more preferably from 5 to 150 μm.

In the plated molded article of the present invention, since a base molding part on which the plating layer (a metal layer or an alloy layer) is formed has concave portions formed by detachment of the heterophasic polymer particles, the plated molded article is superior in adhesiveness between the surface of the base molding part and the plating layer and also superior in appearance thereof.

The plated molded article of the present invention can be used for vehicle parts, electric products, electronic parts, housings, frames, handles, and the like.

8. PLATING METHOD

The plating method of the present invention is a method of forming a plating layer after etching a molded article for plating at a temperature ranging from 30° C. to 80° C.

An etching solution used in the etching step is not particularly limited, but may include dichromic acid, a dichromic acid/sulfuric acid mixed solution, chromic anhydride, a chromic anhydride/sulfuric acid mixed solution, or the like. In the etching step, an etching state varies depending on the temperature of the etching solution and affects the size of anchor holes. Therefore, the temperature of the etching solution is in a range from 30° C. to 80° C., and preferably from 40° C. to 70° C. If the temperature of the etching solution is excessively low, anchor holes are formed insufficiently. On the other hand, if the temperature of the etching solution is excessively high, overetching occurs.

In the subsequent plating step, the method described above can be applied.

9. EXAMPLES

Hereinafter, the present invention will be described more specifically by way of Examples, but the present invention is not limited to these Examples.

9-1. Synthesis of Heterophasic Polymer Particles

Synthesis Example 1

In a stainless steel autoclave equipped with a stirrer, a heating/cooling device, a thermometer, and feeders for raw materials, 150 parts by mass of ion-exchanged water, 100 parts by mass of 1,3-butadiene, 0.5 part by mass of tert-dodecylmercaptan, 4 parts by mass of sodium salt of a higher fatty acid, 0.8 part by mass of sodium carbonate, 0.075 part by mass of potassium hydroxide, and 0.15 part by mass of potassium persulfate were charged and made to react at 80° C. for 5 hours, affording an aqueous dispersion (latex) of diene-based polymer particles (hereinafter, referred to as "raw material particles L1").

As a result of performing laser Doppler/frequency analysis and measuring the volume average particle diameter of the raw material particles L1 by use of a "Microtrac UPA150 particle size analyzer" manufactured by Nikkiso Co., Ltd., the volume average particle diameter of the raw material particles L1 was 83 nm and the standard deviation of particle diameter distribution was 3 nm.

Subsequently, a latex containing 40 parts by mass of the raw material particles L1 and a solution prepared by dissolving 0.2 part by mass of sodium pyrophosphate, 0.004 part by mass of ferrous sulfate heptahydrate, and 0.3 part by mass of glucose in 8 parts by mass of ion-exchanged water were charged into a glass flask equipped with a stirrer in a nitrogen stream, and 30 parts by mass of ion-exchanged water, 0.5 part by mass of potassium rosinate, 45 parts by mass of styrene, 15 parts by mass of acrylonitrile, 0.45 part by mass of tert-dodecylmercaptan, and 0.25 part by mass of cumene hydroperoxide were continuously added over 3.5 hours with stirring at an internal temperature of 70° C. Then, this reaction solution was further stirred for 1 hour, affording an aqueous dispersion (latex) of heterophasic polymer particles P1.

Thereafter, 0.5 part by mass of an anti-aging agent was added, and then an aqueous sulfuric acid solution was added to cause solidification followed by drying, affording a powder of heterophasic polymer particles P1.

1 g of the heterophasic polymer particles P1 was put into 20 ml of acetone and was shaken for 2 hours. Next, the mixture was centrifuged until it was completely divided into two layers, and the insoluble matter was collected, dried and solidified, and then the mass (S grams) of the insoluble matter was measured. Since the mass of the raw material particles contained in 1 g of the heterophasic polymer particles P1 is known (T grams), a graft ratio of 78% was obtained from the following formula.

graft ratio=100×(S−T)/T

An acetone soluble matter obtained in determining the graft ratio, that is, the sample prepared by drying and solidifying an ungrafted (co)polymer and then dissolving it in THF, was subjected to GPC measurement using a differential refractive index detector, and a weight average molecular weight (Mw) by standard polystyrene was calculated to be 103,000.

Further, a content of the acetone soluble matter, that is, the content of structural units derived from the cyanidated vinyl compound (acrylonitrile) constituting the ungrafted (co) polymer (the content of cyanidated vinyl compound unit) was measured. A content of nitrogen was determined by elemental analysis of the sample, and the content of cyanidated vinyl compound unit was calculated from the amount of nitrogen determined and was found to be 25%.

1 g of the heterophasic polymer particles P1 was put into 20 ml of acetone and then was shaken for 2 hours. Subsequently, the mixture was centrifuged until it was completely separated into two layers. The insoluble matter was collected and redispersed in acetone. The dispersion (40 μl) was diluted with 100 g of water. The resulting diluted liquid was placed on a TEM grid and was dried to prepare a sample for particle measurement.

After that, the sample was brought into contact with osmium tetroxide vapor generated by heating to stain the heterophasic polymer particles P1. Using a transmission electron microscope "JEM-1400 Plus" manufactured by JEOL Ltd., 200 particles arbitrarily chosen from among those were observed at a magnification of 2500 times to confirm that there were stained parts and non-stained parts with different phases in a single particle. As a result, it was found that the heterophasic polymer particles P1 were core-shell type heterophasic polymer particles depicted in FIG. 1.

The TEM image obtained was analyzed using image analysis software "Image-Pro Plus Ver. 4.0 for Windows (registered trademark)" and the volume average particle diameter of the heterophasic polymer particles P1 was measured to be 90 nm. The volume of all particles was calculated, and further, the volume % of the polymer particles having a particle diameter being in the particle diameter range of 0.05 μm or larger and smaller than 0.15 μm and the volume % of the polymer particles having a particle diameter being in the particle diameter range of 0.05 μm or more were calculated. The results are shown in Table 1.

Differential scanning calorimetry (DSC) in accordance with JIS K7121 was performed for the heterophasic polymer particles P1, and glass transition temperature Tg was observed. Two Tg's were observed and were −81° C. and 103° C.

Synthesis Examples 2 to 7 and 9

Raw material particles L2 to L7 and L9 were obtained in the same manner as those in the production of the raw material particles L1 in Synthesis Example 1 except that the amount of the electrolyte used and the polymerization time were appropriately adjusted. The glass transition temperatures, the volume average particle diameters, and the standard deviations of the particle diameter distribution of the raw material particles L2 to L7 and L9 were evaluated in the same manner as those in Synthesis Example 1. The results are shown in Table 1.

Subsequently, heterophasic polymer particles P2 to P7 and P9 were synthesized by using latexes containing the raw material particles L2 to L7 and L9 and performing the same operation as in Synthesis Example 1 except that the amount of the polymerization initiator or chain transfer agent used was appropriately adjusted. The physical properties of the heterophasic polymer particles P2 to P7 and P9 were also evaluated in the same manner as those in Synthesis Example 1. The results are shown in Table 1.

Synthesis Example 8

In a stainless steel autoclave equipped with a stirrer, a heating/cooling device, a thermometer, feeders for raw materials, and feeders for aids, 150 parts by mass of ion-exchanged water, 50 parts by mass of 1,3-butadiene, 0.3 part by mass of tert-dodecylmercaptan, 2 parts by mass of sodium salt of a higher fatty acid, 0.075 part by mass of potassium hydroxide, and 0.15 part by mass of potassium persulfate were charged and polymerization was initiated at 80° C. After a lapse of 3 hours, 50 parts by mass of 1,3-butadiene and 0.3 part by mass of tert-dodecylmercaptan were added, and the polymerization was continued for 4 hours, affording an aqueous dispersion of raw material particles L8. The glass transition temperature, the volume average particle diameter, and the standard deviation of the particle diameter distribution of the raw material particles L8 obtained were evaluated in the same manner as those in Synthesis Example 1. The results are shown in Table 1.

Subsequently, heterophasic polymer particles P8 were synthesized by using a latex containing the raw material particles L8 and performing the same operation as those in Synthesis Example 1 except that the amount of the polymerization initiator or chain transfer agent was appropriately adjusted. The physical properties of the heterophasic polymer particles P8 were also evaluated in the same manner as those in Synthesis Example 1. The results are shown in Table 1.

TABLE 1

| | | | Synthesis Example | | | | | | | | |
|---|---|---|---|---|---|---|---|---|---|---|---|
| | | | 1 | 2 | 3 | 4 | 5 | 6 | 7 | 8 | 9 |
| Raw material particle (diene-based polymer particle) | | | L1 | L2 | L3 | L4 | L5 | L6 | L7 | L8 | L9 |
| Composition | 1,3-Butadiene | parts by mass | 100 | 80 | 90 | 100 | 100 | 100 | 100 | 100 | 100 |
| | Styrene | parts by mass | 0 | 20 | 10 | 0 | 0 | 0 | 0 | 0 | 0 |
| Physical properties | Tg | ° C. | −83 | −47 | −65 | −81 | −83 | −82 | −84 | −83 | −83 |
| | Volume average particle diameter | nm | 83 | 56 | 157 | 46 | 263 | 205 | 397 | 388 | 388 |
| | Standard deviation of particle diameter | nm | 3 | 1 | 6 | 1 | 123 | 90 | 250 | 370 | 370 |
| Heterophasic polymer particle | | | P1 | P2 | P3 | P4 | P5 | P6 | P7 | P8 | P9 |
| Composition | Raw material particles | parts by mass | 40 | 40 | 40 | 40 | 40 | 40 | 40 | 40 | 40 |
| | Styrene | parts by mass | 45 | 41 | 42 | 48 | 45 | 45 | 45 | 45 | 45 |
| | Acrylonitrile | parts by mass | 15 | 19 | 18 | 12 | 15 | 15 | 15 | 15 | 15 |

TABLE 1-continued

| | | | Synthesis Example | | | | | | | | |
|---|---|---|---|---|---|---|---|---|---|---|---|
| | | | 1 | 2 | 3 | 4 | 5 | 6 | 7 | 8 | 9 |
| Physical properties | Volume average particle diameter | nm | 90 | 60 | 160 | 50 | 270 | 210 | 400 | 400 | 400 |
| | Amount of heterophasic polymer particles being in the particle diameter range of 0.05 μm or larger and smaller than 0.15 μm | % by volume | 100 | 100 | 77 | 50 | 3 | 22 | 1 | 8 | 8 |
| | Amount of heterophasic polymer particles being in the particle diameter range of 0.05 μm or larger | % by volume | 100 | 100 | 100 | 50 | 100 | 100 | 100 | 100 | 100 |
| | Graft ratio | % | 78 | 75 | 50 | 85 | 65 | 70 | 53 | 53 | 53 |
| | Weight average molecular weight of acetone soluble matter | ten thousand | 10.3 | 9.8 | 9.0 | 10.4 | 8.2 | 9.4 | 9.0 | 9.3 | 9.3 |
| | Content of cyanidated vinyl compound unit in acetone soluble matter | % | 25 | 24 | 23 | 25 | 24 | 25 | 25 | 23 | 23 |
| | Tg | °C. | −81 103 | −45 102 | −64 101 | −80 100 | −82 101 | −80 101 | −83 103 | −82 102 | −82 102 |

9-2. Production of Platability Improver

Example 1-1

15 parts by mass of the heterophasic polymer particles P1 and 30 parts by mass of the heterophasic polymer particles P5 were mixed, affording a platability improver M1.

1 g of the platability improver M1 was put into 20 ml of acetone and was then shaken for 2 hours. Subsequently, the mixture was centrifuged until it was completely separated into two layers, and the insoluble matter was collected and redispersed in acetone. The dispersion (40 μl) was diluted with 100 g of water. The resulting diluted liquid was placed on a TEM grid and was dried to prepare a sample for particle measurement.

After that, the sample was brought into contact with osmium tetroxide vapor generated by heating to stain the platability improver M1. Using a transmission electron microscope "JEM-1400 Plus" manufactured by JEOL Ltd., 200 particles arbitrarily chosen from among those were observed at a magnification of 2500 times.

The TEM image obtained was analyzed using image analysis software "Image-Pro Plus Ver. 4.0 for Windows (registered trademark)" and the volume % of polymer particles having a particle diameter being in the particle diameter range of 0.05 μm or larger and smaller than 0.15 μm and the volume % of polymer particles having a particle diameter being in the particle diameter range of 0.05 μm or larger were calculated. The results are shown in Table 2.

For the platability improver M1, the volume average particle diameter and the standard deviation were measured in the same manner as the heterophasic polymer particles P1, and the coefficient of variation was calculated from the following formula. The results are shown in Table 2.

Coefficient of variation (%)=(standard deviation/volume average particle diameter)×100

Further, a moisture content of the platability improver M1 was measured in accordance with B method (Karl Fischer method) of JIS K7251 "Plastics-Determination of water content". The results are shown in Table 2.

Examples 1-2 to 1-12 and Comparative Examples 1-1 to 1-3

Using the various heterophasic polymer particles in the ratios shown in Table 2, platability improvers M2 to M15 were produced. Then, the physical properties were measured in the same manner as those in Example 1-1. The results are shown in Table 2.

TABLE 2

| | | | Example | | | | | | | | | | | | | Comparative Example | | |
|---|---|---|---|---|---|---|---|---|---|---|---|---|---|---|---|---|---|---|
| | | | 1-1 | 1-2 | 1-3 | 1-4 | 1-5 | 1-6 | 1-7 | 1-8 | 1-9 | 1-10 | 1-11 | 1-12 | 1-1 | 1-2 | 1-3 |
| Platability improver | | | M1 | M2 | M3 | M4 | M5 | M6 | M7 | M8 | M9 | M10 | M11 | M12 | M13 | M14 | M15 |
| Heterophasic polymer particle | P1 | parts by mass | 15 | 9 | 25 | | | 4 | 7 | | | 15 | 15 | 10 | 22 | 15 | 15 |
| | P2 | parts by mass | | | | | | | | | 40 | | | | 23 | | |
| | P3 | parts by mass | | | | | | | | 24 | | | | | | | |
| | P4 | parts by mass | | | | 30 | 25 | | | | | | | | | | |
| | P5 | parts by mass | 30 | 36 | 20 | 15 | 25 | 8 | 14 | | | 30 | 30 | 20 | | | |
| | P6 | parts by mass | | | | | | | | | 48 | | | | | | |
| | P7 | parts by mass | | | | | | | | | 5 | | | | | 30 | 5 |
| | P8 | parts by mass | | | | | | | | | | | | | | | 30 |
| Coefficient of variation of particle diameter | | % | 48 | 47 | 49 | 58 | 54 | 48 | 48 | 42 | 79 | 48 | 48 | 48 | 25 | 28 | 97 |
| Amount of heterophasic polymer particles being in the particle diameter range of 0.05 μm or larger and smaller than 0.15 μm | | % by volume | 36 | 23 | 57 | 34 | 15 | 36 | 36 | 40 | 56 | 36 | 36 | 36 | 100 | 33 | 38 |

TABLE 2-continued

| | | Example | | | | | | | | | | | | Comparative Example | | |
|---|---|---|---|---|---|---|---|---|---|---|---|---|---|---|---|---|
| | | 1-1 | 1-2 | 1-3 | 1-4 | 1-5 | 1-6 | 1-7 | 1-8 | 1-9 | 1-10 | 1-11 | 1-12 | 1-1 | 1-2 | 1-3 |
| Amount of heterophasic polymer particles being in the particle diameter range of 0.05 μm or larger | % by volume | 100 | 100 | 100 | 66 | 87 | 96 | 96 | 83 | 99 | 96 | 96 | 96 | 100 | 100 | 100 |
| Moisture content | % by mass | 0.3 | 0.7 | 0.3 | 0.5 | 0.4 | 0.7 | 0.6 | 0.7 | 0.5 | 0.1 | 0.9 | 0.1 | 1.2 | 1.2 | 0.3 |

9-3. Production and Evaluation of Molded Article for Plating

Example 2-1

45 parts by mass of the platability improver M1 and 55 parts by mass of an acrylonitrile/styrene copolymer (the content of repeating unit derived from acrylonitrile: 30% by mass, the content of repeating unit derived from styrene: 70% by mass, weight average molecular weight Mw: 104,000) as a thermoplastic resin were mixed with a Henschel mixer and then were melt-kneaded (set temperature: 200° C.) using a Banbury mixer, and thus pellets of a composition for plating was prepared.

1 g of the pellets were put into 20 ml of acetone (an appropriate solvent in which the thermoplastic resin is completely dissolved) and then were shaken for 2 hours. Subsequently, the mixture was centrifuged until it was completely separated into two layers, and the insoluble matter was collected and redispersed in acetone. The dispersion (40 μl) was diluted with 100 g of water. The resulting diluted liquid was placed on a TEM grid and was dried to prepare a sample for measuring the platability improver M1 contained in the pellet. Then, the volume % of polymer particles having a particle diameter being in the particle diameter range of 0.05 μm or larger and smaller than 0.15 μm and the volume % of polymer particles having a particle diameter being in the particle diameter range of 0.05 μm or larger were calculated in the same manner as described above, so that the same results as the platability improver M1 before the production of a composition for plating shown in Table 2 were obtained.

For the platability improver M1 collected by the above treatment, the volume average particle diameter and the standard deviation were measured, and the coefficient of variation was calculated from the following formula. The same results as the platability improver M1 before the production of the composition for plating shown in Table 2 were obtained.

Coefficient of variation (%)=(standard deviation/volume average particle diameter)×100

Using the above pellets, injection-molding was performed under the conditions represented by a cylinder set temperature of 220° C. and a mold temperature of 40° C. using an injection molding machine "J100E-C5 type" (model name) manufactured by The Japan Steel Works, Ltd., and thus a specimen with a size in accordance with ISO 179 (notched, 2 mm thick) was obtained. Then, Charpy impact strength (unit: kJ/m$^2$) was measured in accordance with ISO 179 using a digital impact tester "DG-CB" (model name). When the Charpy impact strength is at least 15 kJ/m$^2$, it can be judged that the specimen is superior in impact resistance. The results are shown in Table 3.

Furthermore, a specimen having a length of 150 mm, a width of 70 mm, and a thickness of 3.2 mm was prepared using the above pellets under the above molding conditions, and copper plating was applied to the surface thereof using a CRP process manufactured by Okuno Chemical Industries Co., Ltd. Then, the peeling strength and the appearance of the plating film in the resulting plated molded article were evaluated by the following methods. The results are shown in Table 3.

First, the specimen was immersed in "CRP cleaner" at 40° C. for 3 minutes, thereby being degreased. Thereafter, it was washed with water at 20° C. and was immersed in an etching solution (chromic acid: 400 g/l, sulfuric acid; 400 g/l) at 67° C. for 10 minutes, thereby being etched. Subsequently, the specimen was washed with water at 20° C., was pre-dipped in a 35% aqueous hydrochloric acid solution at 35° C. for 1 minute, and was further immersed in "CRP catalyst" at 35° C. for 6 minutes, thereby being subjected to Pd—Sn colloidal catalyst treatment.

After that, the resulting catalyzed specimen was washed with water at 20° C. and was immersed in "CRP Selector A" and "CRP Selector B" at 45° C. each for 3 minutes, thereby being subjected to conductor treatment. Then, the specimen resulting from the conductor treatment was washed with water at 20° C. and was subjected to electrolytic copper plating at room temperature for 60 minutes, affording a 40 μm thick copper layer. Subsequently, the specimen with the copper layer was washed with water at 20° C. and was dried at 80° C. for 2 hours.

In order to evaluate adhesiveness of the copper layer in the specimen with the copper layer, peeling strength was measured in accordance with JIS H 8630. If the peeling strength is 1.0 kN/m or higher, it can be judged that the specimen is superior in plating adhesiveness.

The specimen with the copper layer was observed visually, and its appearance was judged according to the following criteria.

"○": When a plated molded article has gloss and no excessive irregularities are observed, the appearance is good enough for practical use.

"x": Since irregularities are clearly observed and the appearance is uglified, the article is difficult to be practically used.

Examples 2-2 to 2-11 and Comparative Examples 2-1 to 2-3

Compositions for plating were produced in the same manner as that in Example 2-1 using the various platability improvers and the acrylonitrile/styrene copolymer described above in the ratios shown in Table 3. Then, the various evaluations were performed in the same manner as those in Example 2-1. The results are shown in Table 3.

Example 2-12

30 parts by mass of the platability improver M12, 20 parts by mass of the acrylonitrile/styrene copolymer described above, and 50 parts by mass of a polycarbonate resin "NOVAREX 7022R" (trade name) produced by Mitsubishi Engineering-Plastics Corporation were mixed with a Henschel mixer and then were melt-kneaded (set temperature: 260° C.) using a Banbury mixer, and thus pellets of a composition for plating was prepared.

Using the pellets prepared, a specimen was prepared by performing injection-molding using an injection molding machine "J100E-C5 type" (model name) manufactured by The Japan Steel Works, Ltd. in the same manner as in Example 2-1 except using the conditions represented by a cylinder set temperature of 260° C. and a mold temperature of 60° C. Then, various evaluations were performed. The results are shown in Table 3.

water. The resulting diluted liquid was placed on a TEM grid and was then dried to prepare a sample for particle measurement.

After that, the sample was brought into contact with osmium tetroxide vapor generated by heating to stain the polymer particles. Using a transmission electron microscope "JEM-1400 Plus" manufactured by JEOL Ltd., 200 particles arbitrarily chosen from among those were observed at a magnification of 2500 times.

The TEM image obtained was analyzed using image analysis software "Image-Pro Plus Ver. 4.0 for Windows (registered trademark)" and the volume % of polymer particles having a particle diameter being in the particle diameter range of 0.05 μm or larger and smaller than 0.15 μm and the volume % of polymer particles having a particle diameter being in the particle diameter range of 0.05 μm or larger were calculated. The results are shown in Table 4.

TABLE 3

|  |  |  | Example | | | | | | | | | | | | Comparative Example | | |
| --- | --- | --- | --- | --- | --- | --- | --- | --- | --- | --- | --- | --- | --- | --- | --- | --- | --- |
|  |  |  | 2-1 | 2-2 | 2-3 | 2-4 | 2-5 | 2-6 | 2-7 | 2-8 | 2-9 | 2-10 | 2-11 | 2-12 | 2-1 | 2-2 | 2-3 |
| Composition for plating | Platability improver | M1 | 45 | | | | | | | | | | | | | | |
|  |  | M2 | | 45 | | | | | | | | | | | | | |
|  |  | M3 | | | 45 | | | | | | | | | | | | |
|  |  | M4 | | | | 45 | | | | | | | | | | | |
|  |  | M5 | | | | | 50 | | | | | | | | | | |
|  |  | M6 | | | | | | 12 | | | | | | | | | |
|  |  | M7 | | | | | | | 21 | | | | | | | | |
|  |  | M8 | | | | | | | | 72 | | | | | | | |
|  |  | M9 | | | | | | | | | 45 | | | | | | |
|  |  | M10 | | | | | | | | | | 45 | | | | | |
|  |  | M11 | | | | | | | | | | | 45 | | | | |
|  |  | M12 | | | | | | | | | | | | 30 | | | |
|  |  | M13 | | | | | | | | | | | | | 45 | | |
|  |  | M14 | | | | | | | | | | | | | | 45 | |
|  |  | M15 | | | | | | | | | | | | | | | 50 |
|  | Thermoplastic resin | AS | 55 | 55 | 55 | 55 | 50 | 88 | 79 | 28 | 55 | 55 | 55 | 20 | 55 | 55 | 50 |
|  |  | PC | 0 | 0 | 0 | 0 | 0 | 0 | 0 | 0 | 0 | 0 | 0 | 50 | 0 | 0 | 0 |
| Evaluation | Charpy impact strength | kJ/m² | 30 | 31 | 27 | 20 | 35 | 15 | 26 | 40 | 16 | 30 | 30 | 51 | 8 | 24 | 10 |
|  | Peeling strength | kN/m | 1.6 | 1.4 | 1.8 | 1.8 | 1.2 | 1.0 | 1.1 | 2.0 | 1.6 | 1.1 | 1.4 | 1.6 | 2.3 | 0.9 | 2.0 |
|  | Appearance of plated molded article |  | ○ | ○ | ○ | ○ | ○ | ○ | ○ | ○ | ○ | ○ | ○ | ○ | ○ | ○ | ○ |

As is apparent from Tables 2 and 3, in Examples 2-1 to 2-12, which correspond to the present invention, plated molded articles superior in plating adhesiveness and impact resistance and good in plating appearance were successfully produced. On the other hand, in Comparative Examples 2-1 to 2-3, which do not correspond to the present invention, it was impossible to produce plated molded articles good in impact resistance and plating adhesiveness.

9-4. Production and Evaluation of Pellet Composition for Plating

Experimental Example 3-1

First, 15 parts by mass of the heterophasic polymer particles P1 and 30 parts by mass of the heterophasic polymer particles P9 were mixed, affording mixed particles. 1 g of the mixed particles was put into 20 ml of acetone and was shaken for 2 hours. Subsequently, the mixture was centrifuged until it was completely separated into two layers. The insoluble matter was collected and redispersed in acetone. The dispersion (40 μl) was diluted with 100 g of Furthermore, the volume average particle diameter and the standard deviation were measured or calculated from the TEM image obtained, and then the coefficient of variation was calculated from the following formula. The results are shown in Table 4.

Coefficient of variation (%)=(standard deviation/volume average particle diameter)×100

Then, 45 parts by mass of mixed particles composed of 15 parts by mass of the heterophasic polymer particles P1 and 30 parts by mass of the heterophasic polymer particles P9 and 55 parts by mass of a powder composed of an acrylonitrile/styrene copolymer (the content of repeating unit derived from acrylonitrile: 30% by mass, the content of repeating unit derived from styrene: 70% by mass, weight average molecular weight Mw: 104,000) as a thermoplastic resin were mixed with a Henschel mixer. After that, the mixture was melt-kneaded (set temperature: 200° C.) using a Banbury mixer, and pellets having a roughly cylindrical shape and being non-uniform in size were produced.

The pellets were classified into pellets that pass through a 3-mesh screen and pellets passing through a 5-mesh screen but not pass through a 9-mesh screen, which were then mixed so as to have the ratio shown in Table 4, affording pellet composition N1.

1 g of the pellet composition N1 was put into 20 ml of acetone (an appropriate solvent in which the thermoplastic resin is completely dissolved) and was shaken for 2 hours. Subsequently, the mixture was centrifuged until it was completely separated into two layers. The insoluble matter was collected and redispersed in acetone. The dispersion (40 μl) was diluted with 100 g of water. The resulting diluted liquid was placed on a TEM grid and was dried to prepare a sample for measuring mixed particles of the heterophasic polymer contained in the pellet composition M1. Then, the volume % of polymer particles having a particle diameter being in the particle diameter range of 0.05 μm or larger and smaller than 0.15 μm and the volume % of polymer particles having a particle diameter being in the particle diameter range of 0.05 μm or larger were calculated in the same manner as described above, so that the same results as the mixed particles composed of the heterophasic polymer particles P1 and the heterophasic polymer particles P9 before producing pellets shown in Table 4 were obtained.

For the mixed particles collected by the above treatment, the volume average particle diameter and the standard deviation were measured or calculated, and the coefficient of variation was calculated from the following formula. The same results as the mixed particles before producing pellets shown in Table 2 were obtained.

Coefficient of variation (%)=(standard deviation/ volume average particle diameter)×100

Using the above pellet composition N1, injection-molding was performed under the conditions represented by a cylinder set temperature of 220° C. and a mold temperature of 40° C. using an injection molding machine "J100E-C5 type" (model name) manufactured by The Japan Steel Works, Ltd., and thus a specimen with a size in accordance with ISO 179 (notched, 2 mm thick) was obtained. Then, Charpy impact strength (unit: kJ/m$^2$) was measured in accordance with ISO 179 using a digital impact tester "DG-CB" (model name). When the Charpy impact strength is at least 15 kJ/m$^2$, it can be judged that the specimen is superior in impact resistance. The results are shown in Table 4.

Furthermore, a specimen having a length of 150 mm, a width of 70 mm, and a thickness of 3.2 mm was prepared using the above pellet composition N1 under the above molding conditions, and copper plating was applied to the surface thereof using a CRP process manufactured by Okuno Chemical Industries Co., Ltd. Then, the peeling strength and the appearance of the plating film in the resulting plated molded article were evaluated by the following methods. The results are shown in Table 4.

First, the specimen was immersed in "CRP cleaner" at 40° C. for 3 minutes, thereby being degreased. Thereafter, it was washed with water at 20° C. and was immersed in an etching solution (chromic acid: 400 g/l, sulfuric acid; 400 g/l) at 67° C. for 10 minutes, thereby being etched. Subsequently, the specimen was washed with water at 20° C., was pre-dipped in a 35% aqueous hydrochloric acid solution at 35° C. for 1 minute, and was further immersed in "CRP catalyst" at 35° C. for 6 minutes, thereby being subjected to Pd—Sn colloidal catalyst treatment.

After that, the resulting catalyzed specimen was washed with water at 20° C. and was immersed in "CRP Selector A" and "CRP Selector B" at 45° C. each for 3 minutes, thereby being subjected to conductor treatment. Then, the specimen resulting from the conductor treatment was washed with water at 20° C. and was subjected to electrolytic copper plating at room temperature for 60 minutes, affording a 40 μm thick copper layer. Subsequently, the specimen with the copper layer was washed with water at 20° C. and was dried at 80° C. for 2 hours.

In order to evaluate adhesiveness of the copper layer in the specimen with the copper layer, peeling strength was measured in accordance with JIS H 8630. If the peeling strength is 1.0 kN/m or higher, it can be judged that the specimen is superior in plating adhesiveness.

The specimen with the copper layer was observed visually, and its appearance was judged according to the following criteria.

"○": When a plated molded article has gloss and no excessive irregularities are observed, the appearance is good enough for practical use.

"x": Since irregularities are clearly observed and the appearance is uglified, the article is difficult to be practically used.

Experimental Examples 3-2 to 3-13

Various heterophasic polymer particles were used in the proportions shown in Table 4 to obtain mixed particles, and then the obtained mixed particles and a thermoplastic resin were used together to prepare pellets in the same manner as that in Example 3-1 and produce pellet compositions for plating N2 to N13. Then, the physical properties were measured in the same manner as those in Example 3-1. The results are shown in Table 4.

Experimental Example 3-14

10 parts by mass of the heterophasic polymer particles P1 and 20 parts by mass of the heterophasic polymer particles P9 were mixed, affording 30 parts by mass of mixed particles. Subsequently, 30 parts by mass of the resulting mixed particles, 20 parts by mass of the acrylonitrile/styrene copolymer described above, and 50 parts by mass of a polycarbonate resin "NOVAREX 7022R" (trade name) produced by Mitsubishi Engineering-Plastics Corporation were mixed with a Henschel mixer. After that, the mixture was melt-kneaded (set temperature: 260° C.) using a Banbury mixer, and pellets having a roughly cylindrical shape and being non-uniform in size were produced. Then, a pellet composition for plating N14 was produced in the same manner as that in Example 3-1, and the particle diameter distribution of the heterophasic polymer particles contained, and the like were measured. The results are shown in Table 4.

Using the pellet composition N14 prepared, a specimen was prepared by performing injection-molding using an injection molding machine "J100E-C5 type" (model name) manufactured by The Japan Steel Works, Ltd. in the same manner as in Example 1 except using the conditions represented by a cylinder set temperature of 260° C. and a mold temperature of 60° C. Then, various evaluations were performed. The results are shown in Table 4.

Experimental Examples 3-15 to 3-23

Various heterophasic polymer particles were used in the proportions shown in Table 5 to obtain mixed particles, and then the obtained mixed particles and a thermoplastic resin were used together to prepare pellets in the same manner as that in Experimental Example 3-1 and produce pellet compositions for plating N15 to N23. Then, the physical properties were measured in the same manner as those in Example 3-1. The results are shown in Table 5.

TABLE 4

|  |  |  |  |  | Experimental Example | | | | | | |
|---|---|---|---|---|---|---|---|---|---|---|---|
|  |  |  |  |  | 3-1 | 3-2 | 3-3 | 3-4 | 3-5 | 3-6 | 3-7 |
| Pellet composition for plating |  |  |  |  | N1 | N2 | N3 | N4 | N5 | N6 | N7 |
|  | Pellet | Heterophasic polymer particles | P1 | parts by mass | 15 | 9 | 25 |  |  | 4 | 7 |
|  |  |  | P2 | parts by mass |  |  |  |  |  |  |  |
|  |  |  | P3 | parts by mass |  |  |  |  |  |  |  |
|  |  |  | P4 | parts by mass |  |  |  | 30 | 25 |  |  |
|  |  |  | P5 | parts by mass |  |  |  |  |  |  |  |
|  |  |  | P6 | parts by mass |  |  |  |  |  |  |  |
|  |  |  | P7 | parts by mass |  |  |  |  |  |  |  |
|  |  |  | P8 | parts by mass |  |  |  |  |  |  |  |
|  |  |  | P9 | parts by mass | 30 | 36 | 20 | 15 | 25 | 8 | 14 |
|  |  | Coefficient of variation of particle diameter |  | % | 48 | 47 | 49 | 58 | 54 | 48 | 48 |
|  |  | Amount of heterophasic polymer particles being in the particle diameter range of 0.05 μm or larger and smaller than 0.15 μm |  | % by volume | 36 | 23 | 57 | 34 | 15 | 36 | 36 |
|  |  | Amount of heterophasic polymer particles being in the particle diameter range of 0.05 μm or larger |  | % by volume | 100 | 100 | 100 | 66 | 87 | 96 | 96 |
|  |  | Thermoplastic resin |  |  |  |  |  |  |  |  |  |
|  |  | AS |  | parts by mass | 55 | 55 | 55 | 55 | 50 | 88 | 79 |
|  |  | PC |  | parts by mass | 0 | 0 | 0 | 0 | 0 | 0 | 0 |
|  | Configuration | Pellets capable of passing through a 3-mesh screen |  | % by mass | 100 | 100 | 100 | 100 | 99 | 99 | 98 |
|  |  | Pellets capable of passing through a 5-mesh screen and incapable of passing through a 9-mesh screen |  | % by mass | 100 | 100 | 99 | 100 | 98 | 70 | 70 |
| Evaluation | Charpy impact strength |  |  | kJ/m$^2$ | 30 | 31 | 27 | 20 | 35 | 15 | 26 |
|  | Peeling strength |  |  | kN/m | 1.6 | 1.4 | 1.8 | 1.8 | 1.2 | 1.0 | 1.1 |
|  | Appearance of plated molded article |  |  |  | ○ | ○ | ○ | ○ | ○ | ○ | ○ |

|  |  |  |  |  | Experimental Example | | | | | | |
|---|---|---|---|---|---|---|---|---|---|---|---|
|  |  |  |  |  | 3-8 | 3-9 | 3-10 | 3-11 | 3-12 | 3-13 | 3-14 |
| Pellet composition for plating |  |  |  |  | N8 | N9 | N10 | N11 | N12 | N13 | N14 |
|  | Pellet | Heterophasic polymer particles | P1 | parts by mass |  |  | 15 | 15 | 15 | 15 | 10 |
|  |  |  | P2 | parts by mass |  | 40 |  |  |  |  |  |
|  |  |  | P3 | parts by mass | 24 |  |  |  |  |  |  |
|  |  |  | P4 | parts by mass |  |  |  |  |  |  |  |
|  |  |  | P5 | parts by mass | 48 |  |  |  |  |  |  |
|  |  |  | P6 | parts by mass |  | 5 |  |  |  |  |  |
|  |  |  | P7 | parts by mass |  |  |  |  |  |  |  |
|  |  |  | P8 | parts by mass |  |  |  |  |  |  |  |
|  |  |  | P9 | parts by mass |  |  | 30 | 30 | 30 | 30 | 20 |
|  |  | Coefficient of variation of particle diameter |  | % | 42 | 79 | 48 | 48 | 48 | 48 | 48 |
|  |  | Amount of heterophasic polymer particles being in the particle diameter range of 0.05 μm or larger and smaller than 0.15 μm |  | % by volume | 40 | 56 | 36 | 36 | 36 | 36 | 36 |
|  |  | Amount of heterophasic polymer particles being in the particle diameter range of 0.05 μm or larger |  | % by volume | 83 | 99 | 96 | 96 | 96 | 96 | 96 |
|  |  | Thermoplastic resin |  |  |  |  |  |  |  |  |  |
|  |  | AS |  | parts by mass | 28 | 55 | 55 | 55 | 55 | 55 | 20 |
|  |  | PC |  | parts by mass | 0 | 0 | 0 | 0 | 0 | 0 | 50 |
|  | Configuration | Pellets capable of passing through a 3-mesh screen |  | % by mass | 99 | 99 | 100 | 99 | 98 | 98 | 100 |
|  |  | Pellets capable of passing through a 5-mesh screen and incapable of passing through a 9-mesh screen |  | % by mass | 70 | 93 | 80 | 95 | 54 | 52 | 100 |
| Evaluation | Charpy impact strength |  |  | kJ/m$^2$ | 40 | 16 | 30 | 30 | 30 | 30 | 51 |
|  | Peeling strength |  |  | kN/m | 2.0 | 1.6 | 1.1 | 1.4 | 1.1 | 1.4 | 1.6 |
|  | Appearance of plated molded article |  |  |  | ○ | ○ | ○ | ○ | ○ | ○ | ○ |

TABLE 5

| | | | | Experimental Example | | | | | | | | |
|---|---|---|---|---|---|---|---|---|---|---|---|---|
| | | | | 3-15 | 3-16 | 3-17 | 3-18 | 3-19 | 3-20 | 3-21 | 3-22 | 3-23 |
| Pellet composition for plating | | | | N15 | N16 | N17 | N18 | N19 | N20 | N21 | N22 | N23 |
| | Pellet | Heterophasic polymer particles | P1 parts by mass | 22 | 15 | | | | 15 | 15 | 15 | 15 | 15 |
| | | | P2 parts by mass | 23 | | | | | | | | |
| | | | P5 parts by mass | | | 5 | 30 | | 30 | 30 | 30 | 30 |
| | | | P7 parts by mass | | 30 | | | 5 | | | | |
| | | | P8 parts by mass | | | | | 30 | | | | |
| | | | P9 parts by mass | | | | 15 | | | | | |
| | | Coefficient of variation of particle diameter | % | 25 | 28 | 49 | 45 | 97 | 48 | 48 | 48 | 48 |
| | | Amount of heterophasic polymer particles being in the particle diameter range of 0.05 μm or larger and smaller than 0.15 μm | % by volume | 100 | 33 | 89 | 5 | 38 | 36 | 36 | 36 | 36 |
| | | Amount of heterophasic polymer particles being in the particle diameter range of 0.05 μm or larger | % by volume | 100 | 100 | 99 | 77.48 | 100 | 96 | 96 | 96 | 96 |
| | | Thermoplastic resin AS | parts by mass | 55 | 55 | 95 | 55 | 50 | 55 | 55 | 55 | 55 |
| | Configuration | Pellets capable of passing through a 3-mesh screen | % by mass | 97 | 97 | 99 | 97 | 97 | 97 | 100 | 93 | 100 |
| | | Pellets capable of passing through a 5-mesh screen and incapable of passing through a 9-mesh screen | % by mass | 97 | 97 | 49 | 94 | 96 | 93 | 49 | 40 | 42 |
| Evaluation | Charpy impact strength | | kJ/m² | 8 | 24 | 10 | 30 | 10 | 10 | 30 | 24 | 26 |
| | Peeling strength | | kN/m | 2.3 | 0.9 | 0.8 | 0.8 | 2.0 | 1.5 | 1.0 | 1.1 | 1.2 |
| | Appearance of plated molded article | | | ○ | ○ | ○ | ○ | ○ | ○ | x | x | x |

As is apparent from Tables 4 and 5, Experimental Examples 3-1 to 3-14 were able to produce plated molded articles superior in plating adhesiveness and impact resistance and better in plating appearance as compared with Experimental Examples 3-15 to 3-23.

The invention claimed is:

1. A platability improver comprising heterophasic polymer particles having a coefficient of variation of particle diameter of 40% to 90%.

2. The platability improver according to claim 1, wherein a content ratio of polymer particles having a particle diameter of 0.05 μm or larger in the heterophasic polymer particles is 80% by volume or more based on a whole of the heterophasic polymer particles, and
wherein a content ratio of polymer particles having a particle diameter of 0.05 μm or larger and smaller than 0.15 μm in the heterophasic polymer particles is in a range from 10% to 60% by volume based on the whole of the heterophasic polymer particles.

3. The platability improver according to claim 1, further comprising water.

4. A molded article for plating comprising the platability improver according to claim 1 and a thermoplastic resin.

5. The molded article for plating according to claim 4, wherein content ratios of the heterophasic polymer particles contained in the platability improver and the thermoplastic resin are, respectively, 10% to 80% by mass and 20% to 90% by mass based on 100% by mass of a total of the two.

6. A plated molded article comprising the molded article for plating according to claim 4, and a plating layer disposed on a surface of the molded article for plating.

7. A plating method that is a method for forming a plating layer on the molded article for plating according to claim 4, the method comprising: etching the molded article for plating at a temperature in a range from 30° C. to 80° C.; and then forming the plating layer.

8. A pellet composition for plating comprising heterophasic polymer particles in the platability improver according to claim 1,
the pellet composition being for use in formation of a molded article for plating,
the pellet composition comprising pellets each comprising a matrix phase comprising a thermoplastic resin and the heterophasic polymer particles dispersed in the matrix phase,
a content ratio of pellets that pass through a 3-mesh screen is 98% by mass or more with respect to a total amount of the pellet composition, and
a content ratio of pellets that pass through a 5-mesh screen and do not pass through a 9-mesh screen is 50% by mass or more with respect to the total amount of the pellet composition.

9. The pellet composition for plating according to claim 8, wherein content ratios of the heterophasic polymer particles and the thermoplastic resin contained in the pellet are respectively 10% to 80% by mass and 20% to 90% by mass based on 100% by mass of a total of the two.

10. A method for producing a molded article for plating, comprising:
melt-kneading the pellet composition for plating according to claim 8; and
molding the melt-kneaded pellet composition for plating into a prescribed shape.

11. A molded article for plating, obtained by melt-kneading the pellet composition for plating according to claim 8, and then molding the melt-kneaded pellet composition for plating into a prescribed shape.

12. A method for producing a plated molded article, the method comprising:
- melt-kneading the pellet composition for plating according to claim 8;
- molding the melt-kneaded pellet composition for plating into a prescribed shape;
- etching the resulting molded article for plating; and
- plating.

13. A plated molded article comprising a resin molded part and a plating layer,
- wherein the plated molded article is obtained by melt-kneading the pellet composition for plating according to claim 8, molding the melt-kneaded pellet composition for plating into a prescribed shape, etching the resulting molded article for plating, and plating.

* * * * *